US012571310B2

(12) United States Patent
Baker, Jr.

(10) Patent No.: US 12,571,310 B2
(45) Date of Patent: Mar. 10, 2026

(54) POWER SYSTEM WITH CARBON DIOXIDE WORKING FLUID, GENERATOR, AND PROPULSION SYSTEM

(71) Applicant: Kenneth Colin Baker, Jr., Hemet, CA (US)

(72) Inventor: Kenneth Colin Baker, Jr., Hemet, CA (US)

( * ) Notice: Subject to any disclaimer, the term of this patent is extended or adjusted under 35 U.S.C. 154(b) by 0 days.

(21) Appl. No.: 18/829,736

(22) Filed: Sep. 10, 2024

(65) Prior Publication Data

US 2025/0270931 A1     Aug. 28, 2025

Related U.S. Application Data

(63) Continuation of application No. 18/320,178, filed on May 18, 2023, now Pat. No. 12,091,978.

(51) Int. Cl.
| | |
|---|---|
| *F01B 29/10* | (2006.01) |
| *F01B 9/02* | (2006.01) |
| *F01B 25/06* | (2006.01) |
| *H02K 7/02* | (2006.01) |
| *H02K 7/18* | (2006.01) |

(52) U.S. Cl.
CPC .............. *F01B 29/10* (2013.01); *F01B 25/06* (2013.01); *H02K 7/1815* (2013.01); *F01B 9/026* (2013.01); *H02K 7/025* (2013.01)

(58) Field of Classification Search
CPC .......... F01B 29/10; F01B 25/06; F01B 9/026; H02K 7/1815; H02K 7/025; F01K 25/103; F01K 7/32; F01K 7/36; F01K 27/00
See application file for complete search history.

(56) References Cited

U.S. PATENT DOCUMENTS

| | | | |
|---|---|---|---|
| 2014/0088773 A1* | 3/2014 | Davidson ................. | H02K 7/18 |
| | | | 700/288 |
| 2016/0017758 A1* | 1/2016 | Vermeersch ............ | F01K 13/02 |
| | | | 60/646 |
| 2017/0130614 A1* | 5/2017 | Held ........................ | F01K 25/04 |
| 2018/0187627 A1* | 7/2018 | Apte ........................ | F02C 1/105 |
| 2022/0403759 A1* | 12/2022 | Stapp, III ................ | F01K 13/00 |

* cited by examiner

*Primary Examiner* — Matthew T Largi
(74) *Attorney, Agent, or Firm* — Plager Schack LLP; Mark H. Plager; Michael J. O'Brien

(57) ABSTRACT

Embodiments are directed to a power system for generating mechanical energy from input electrical energy. The system includes a liquid tank configured to house fluid and communicate with a fluid compressor and an evaporator, a fluid compressor configured to compress the fluid to a higher-pressure state, a fluid pump configured to receive fluid from the condenser and convert kinetic energy from the fluid to mechanical energy, and a suction fan configured to blow air between the evaporator and condenser. The evaporator changes the fluid's state from a liquid to a gas. The condenser changes the fluid's state from a gas to a liquid. The system includes an accumulator tank to hold the fluid from the condenser, a piping network that communicates the fluid between the components, an enclosure that houses the components of the power system, and a power supply that delivers electricity to the fluid compressor and electric components.

8 Claims, 11 Drawing Sheets

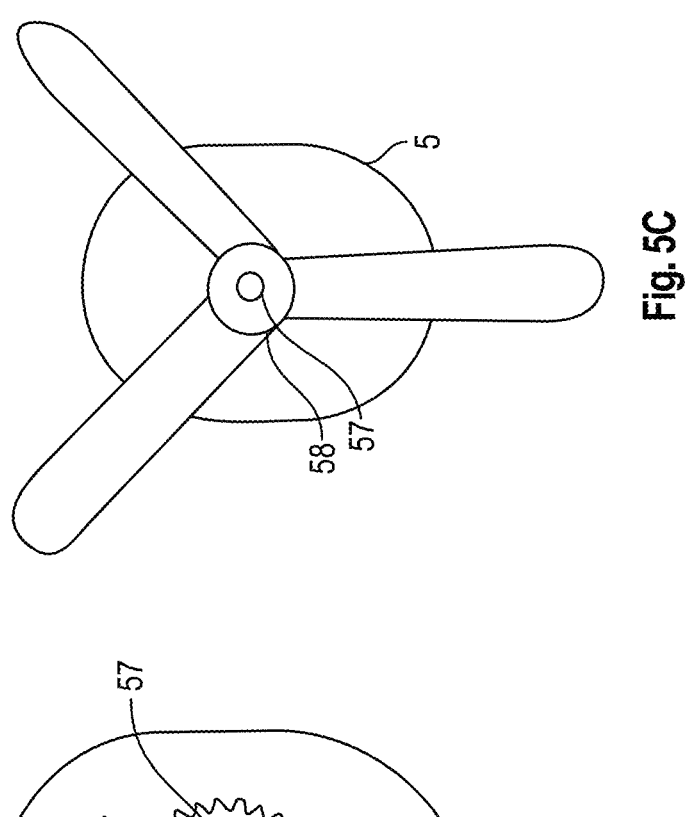
Fig. 5C
Fig. 5B
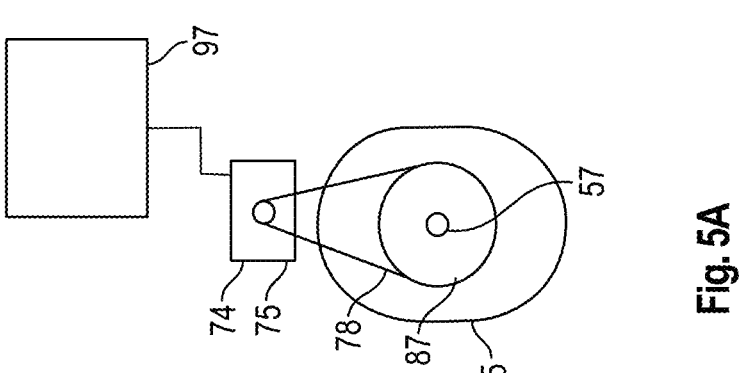
Fig. 5A

Start Mode/Idel/Mode

Operation Mode Of
System Thermodynamic's

| Property Name | Property ID | Properties Downstream of CO2 Piston Compressor Leaving Discharge Port of Compressor | | Properties Downstream of Pressure Differential Orifice Entering Suction Port Of Pump | | Properties Upstream Of CO2 Piston Compressor Quality Entering Suction Port Of Compressor | | Units SI |
|---|---|---|---|---|---|---|---|---|
| | | ROW 1 Maximum Operating | Idle | ROW2 Maximum Operating (Liquid CO2) | Idle (Liquid CO2) | Maximum Operating (Gas CO2) | Idle (Gas CO2) | |
| Thermodynamics Properties Main | | | | | | | | |
| Pressure (absolute) | P | 90. | 54. | 17. | 10. | 30. | 18.6 | bar |
| Temperature | T | 115.6 | 87.0 | -24 | -40 | -5. | -21. | °C |
| Density | d | 150.3 | 93.47 | 1052.57 | 1117.25 | 85.9 | 51.1 | kg/m³ |
| Specific Volume | V | .0066 | .0106 | .0009 | .0008 | 0.0116 | .0195 | m³/kg |
| Specific Enthalpy | h | 26.44 | 16.72 | -362.18 | -393.92 | -85.70 | -84.37 | KJ/kg |
| Specific Entropy | s | -0.7 | -0.66 | -1.94 | -2.07 | -0.9 | -0.83 | KJ/(kg °k) |
| Specific Exergy | ex | 81.63 | 67.73 | -212.46 | 234.26 | -15.60 | -19.73 | KJ/kg |
| Specific Internal Energy | u | -33.39 | -41.04 | -362.80 | -394.82 | -120.61 | -120.71 | KJ/kg |
| Specific Isobaric Heat Capacity | Cp | 1.32 | 1.18 | 2.11 | 2.00 | NA | NA | KJ(kg °k) |
| Specific Isochoric Heat Capacity | Cv | 0.81 | .77 | .93 | .93 | NA | NA | KJ(kg °k) |
| Speed of sound | W | 281. | 271.68 | 738.11 | 857.75 | NA | NA | m/s |
| Transport Properties | | | | | | | | |
| Thermal Conductivity | H | .03 | .02 | .14 | .16 | NA | NA | W/(k°m) |
| Thermal Diffusivity | G | .15 | .22 | .06 | .07 | NA | NA | mm²/S |
| Dynamic Viscosity | dv | 21.43 | 18.88 | 150.47 | 194 | NA | NA | uPa°S |
| Kinetic Viscosity | ky | .14 | .20 | .14 | .17 | NA | NA | mm²/S |
| Prandtl Number | Pr | .94 | .89 | .25 | 2.42 | NA | NA | Dimensionless |
| Thermodynamic Properties Other | | | | | | | | |
| Specific Helmholtz Free Energy | H | 245.23 | 197.56 | 119.31 | 88.37 | 123.03 | 90.26 | KJ/kg |
| Specific Gibbs Free Energy | G | 305.08 | 255.32 | 120.92 | 89.26 | 157.93 | 126.59 | KJ/kg |
| Isentropic Exponent | Kape | 1.32 | 1.27 | 337.32 | 822.00 | NA | NA | Dimensions |
| Isobaric Volume Expansion Coefficient | Abha | .005 | .0048 | .0044 | .0036 | NA | NA | 1/K |
| Compressibility Factor | 2 | .81 | .84 | .034 | .020 | .69 | .76 | Dimensions |
| Partial Derivtive (dV/dt) P | Dvdt | .00003 | .00005 | .000004 | .000003 | NA | NA | m³/(Kg•K) |
| Partial Derivtive (dv/dp) T | Dvdp | -.00009 | .0023 | -.000003 | .000002 | NA | NA | m³/(Kg•MPa) |
| Partial Derivtive (dp/dt) V | Dpdt | .037 | .021 | 1.12 | 1.40 | NA | NA | mPa/K |
| Partial Derivtive (dp/dv) T | Dpdv | -1104.22 | -424.51 | -266581.48 | -43058223 | NA | NA | mPa•Kg/m³ |
| Isothermal Joel-Thompson Coefficient | iJTC | -6.68 | -7.81 | -.09 | .13 | NA | NA | KJ/(kg•mPa) |
| Joel-Thompson Coefficient | JTC | 5.06 | 6.61 | .04 | .06 | NA | NA | K/mPa |
| Isothermal Compressibility | Kt | .22 | | .0039 | .0025 | NA | NA | 1/mPa |

Fig. 11

POWER SYSTEM WITH CARBON DIOXIDE WORKING FLUID, GENERATOR, AND PROPULSION SYSTEM

BACKGROUND

The embodiments herein relate generally to a mechanical system that stores mass energy and contains a source of energy at a constant momentum using carbon dioxide as a working fluid. Transferring consumed electrical energy to internal and specific energy transferred to kinetic energy generating rotational energy in an isolated piping network.

Prior to the embodiments of the disclosed invention, combustion engine converting chemical potential energy contained in a carrier fuel into kinetic energy work in an open type system, creating environmental emissions. The thermal efficiency for a typical gasoline automobile engine operates at around 25% efficiency, a large coal-fueled electrical generating plant at about 46%, Formula One motorsports peak around 45-50%, largest diesel engine in the world peaks at 51.7% and in a combined cycle Plant efficiencies are approaching 60% however it depends on the fuel source. Electric motors electric energy delivered by the battery is transformed into electromagnetic energy which turns the rotor. Transferring electromagnetic energy to kinetic energy. Asynchronous motors offer energy efficiency between 75 to 80% compared to synchronous motor at 90% efficiency. Combustion engine and electric motor have a range of travel depending on capacity of battery for electric motor and size of fuel tank for combustion engine other factors such as average speed, acceleration intensity, road typography and gross weight determine range of travel before visiting an external energy source.

SUMMARY

In some examples of the apparatus and system and methods disclosed here in. This problem is solved using a real gas carbon dioxide as a working fluid being a conservative force in a close loop piping network. A piping network communicating the work fluid between components. Where different components transfer different total energies derived from the same working fluid mass-energy and momentum, a function of several equal derivatives that run parallel to each other. The present invention is configured to generate mechanical energy from positive displacement from CO2 reciprocating piston compressor engine type with crankshaft configured to transfer internal energy mechanical work to kinetic energy generating rotational energy and internal energy heat transfer of working fluid discharged out compressor to Gibbs Free Energy from working fluid delivered to condensor and evaporator and driving the momentum of working fluid in piping network delivered to Centrifugal pump with crankshaft. Centrifugal pump is configured to transfer momentum and mass-energy of working fluid specific energy to kinetic energy generating rotational energy. Furthermore, working fluid collisions between molecules and the walls are elastic with no loss to friction and no dissipated heat, total work done by working fluid is zero conserving momentum of mass-energy and storing mass-energy as rest mass when system is at rest.

The invention is described more fully hereinafter with references to the accompanying drawings in which exemplary embodiments of the invention are shown. Throughout the drawings and detailed description.

Some specific embodiments relate to a power system for generating mechanical energy and thermal energy from electrical energy input. The power system includes a compressor with crankshaft that rotates with pressurization of pistons compressing working fluid driving momentum in piping network. A condenser is operatively connected to the compressor and receives high pressure, high temperature carbon dioxide gas. Forced air passing over condenser coils cooling high-pressure carbon dioxide gas traveling downstream too high pressure differential orifice where high-pressure carbon dioxide gas is restricted causing a phase change to low temperature, medium pressure liquid carbon dioxide. Liquid carbon dioxide enters a flash tank where flash gas occurs allowing flash gas to absorb heat which helps to cool the rest of the liquid carbon dioxide. Flash gas is discharged out of flash tank passing through flash gas bypass valve branched into piping network upstream of compressor. Medium pressure low temperature liquid carbon dioxide leaving flash tank traveling downstream passing through low pressure differential orifice leaving as low pressure low temperature liquid carbon dioxide traveling downstream to centrifugal pump spinning impellers and rotors rotating crankshaft. An evaporator is operatively connected to the centrifugal pump and receives liquid carbon dioxide. Hot forced air passing over evaporator coils creates phase change to low pressure gas carbon dioxide leaving evaporator traveling downstream to liquid tank configured to trap any remaining liquid carbon dioxide. Carbon dioxide gas leaving liquid tank traveling downstream to suction port of compressor repeating the close loop cycle. An accumulator tank branched into piping network at low and high pressure side of system and stores mass-energy when system is in rest and idle mode increasing pressure of working fluid in piping network for acceleration and decreasing pressure of working fluid for deceleration as the change in momentum of working fluid delivered to suction port of compressor.

In some examples compressor can be sub critical or trans critical and can have multiple stages. The present invention describes a CO2 reciprocating piston compressor with crankshaft. Other types of positive displacement CO2 compressors with crankshaft can be used.

In some embodiments the compressor with crankshaft and crank pulley is attached to alternator pulley with serpentine belt rotating with same motion of rotation. In some configurations compressor crankshaft can be attached to alternator shaft such that they rotationally coupled together. In some embodiments compressor crankshaft is configured to rotate along and access transferring internal energy mechanical work to kinetic energy and internal energy heat transfer from change in entropy between suction and discharge port of compressor to Gibbs Free Energy delivered to condensor and evaporator by piping network.

In some embodiments compressor is initially energized from stored electrical energy in a battery bank routed through DC/AC transformer. Pressurizing pistons compressing stored working fluid in piping network rotating compressor crankshaft and crankpully attached to alternator pulley energizing windings supplying compressor electrical energy consumption. Working fluid has a constant momentum in compressor from pressurizations of pistons transferring kinetic energy to rotational energy transferred to electrical energy at alternator supplying compressor with electrical energy consumption.

In some embodiments air condenser down stream of compressor is an air cooled condenser and the air cooled condenser generally contains coils, heat sink or cooling fans and may be configured and positioned to receive airflow from one or more fans. In some examples is a fluid cooled condenser and configured to receive cooling medium generally containing water/glycol mixture removing heat from the carbon dioxide working fluid.

In some embodiments low and high pressure differential orifice can be pressure regulating valve, expansion valve, needle valve, control valve, and hold back valve, restricting flow creating expansion of working fluid downstream. And some embodiments a high-pressure differential orifice upstream of flash tank and upstream of centrifugal pump and downstream of condenser and a low pressure differential office downstream of flash tank are configured to maintain differential pressures throughout system at an equal rate of change to pressure and temperature of working fluid delivered to suction port of compressor. In some embodiments a flash tank downstream of high pressure differential orifice and upstream of low pressure differential orifice and is configured to release flash gas through a flash gas bypass valve to suction port of compressor. In some examples increasing high and low pressure differential orifice throat size decreases flow velocity decreasing rotational energy at centrifugal pump and decreasing orifice throat size increases flow velocity increasing rotational energy at centrifugal pump.

In some embodiments centrifugal pump located downstream of low pressure differential orifice generates rotational energy from specific energy of working fluid momentum mass-energy, passing through spinning rotors/impellers and crankshaft. In another embodiment a rotary engine or a piston engine located upstream of pressure differential orifice on high-pressure side of system and is configured to receive working fluid momentum and mass-energy transferred to rotational energy spinning crankshaft about an axis transferring specific energy to kinetic energy. In some examples, centrifugal pump can be other types of dynamic type or thermal type of mechanical components generating rotational energy.

In some embodiments centrifugal pump with crankshaft and crank pulley is attached to alternator pulley with serpentine belt rotating with same motion of rotation. In some configurations centrifugal pump crankshaft can be attached to alternator shaft such that they rotationally coupled together. In some embodiments centrifugal pump crankshaft is configured to rotate along an axis transferring specific energy to kinetic energy generating rotational energy to alternator, and is configured to supply electricity to at least one electrical storage device and a power grid. In other embodiments, centrifugal pump with crank pulley and flywheel and is configured to rotate along and axis transferring kinetic energy generating rotational energy for mechanical energy in a propulsion system. In another embodiment, centrifugal pump with optimized shaft includes a propeller that is connected to optimized shaft and configured to increase the dynamic pressure of air transferring kinetic energy generating rotational energy for mechanical energy in a propulsion system.

In some embodiments, an evaporator downstream of centrifugal pump and upstream of liquid tank. The air cooled evaporator generally contains coils, heat sink or fins, and may be configured and positioned to receive airflow from one or more fans. In some examples is a fluid evaporator and configured to absorb heat from water/glycol mixture to the working fluid carbon dioxide stream.

In some embodiments an accumulator tank branched in low pressure and high pressure side of piping network configured to increase and decrease pressure delivered to suction port of compressor. Change in pressure changes volumetric displacement and discharge pressure at compressor equally affecting internal energy at compressor and specific energy of working fluid entering centrifugal pump increasing and decreasing rotational energy at compressor and centrifugal pump.

In some examples, valves and actuators can be electronic or phuemetic.

In some embodiments, the power system includes an automated control system configured to control and monitor at least one of a set of processes for the operation of the power system.

In some embodiments, the power system includes at least one of a pressure transducer, thermocouple, and mass flow meter in connection with the automated control system.

In some embodiments, the power system includes a human-machine interface configured to provide an interface for humans to interact with at least one of the components of the power system.

In some embodiments, the power system includes at least one programmable logic board (PLC) in connection with the automated control system, wherein the PLC is configured to control and monitor at least one of the components of the power system.

In some embodiments, the power system includes a least one crankshaft, crankpully, an alternator, an alternator pulley, and a serpentine belt, wherein the crankshaft is connected to the crankpully and is further connected to the alternator by the serpentine belt and the alternator pulley, where the alternator is configured to generate electricity.

In some embodiments, the fluid consists of a mixture of $CO_2$ and polyester lubricant.

In some embodiments, the fluid mixture consists of between 2 percent and 5 percent polyester lubricant.

In some embodiments, the fluid mixture consists of between 95 percent and 98 percent $CO_2$.

In some embodiments, the enclosure includes at least one wall vent configured to allow air to move between the inside and the outside of the enclosure.

In some embodiments, a flash tank with a pressure transducer downstream of high pressure differential orifice and upstream of low pressure differential orifice is configured to pass flash gas upstream of compressor.

In some embodiments, the piping network includes at least one of a manifold, tee junction, pipe, fitting, valve, and filter. Piping network designed to maintain laminate flow.

In some embodiments, the fluid may be one of a liquid, a gas, and a combination of a liquid and a gas.

In some embodiments, the power system includes electronic components wherein the power supply is configured to deliver electricity to the electronic components.

BRIEF DESCRIPTION OF DRAWINGS

The detailed description of some embodiments of the invention is made below with reference to the accompanying figures, wherein like numerals represent corresponding parts of the figures.

FIG. 5 shows a schematic view of front and back side of rotary engine;

5

Figure 6:
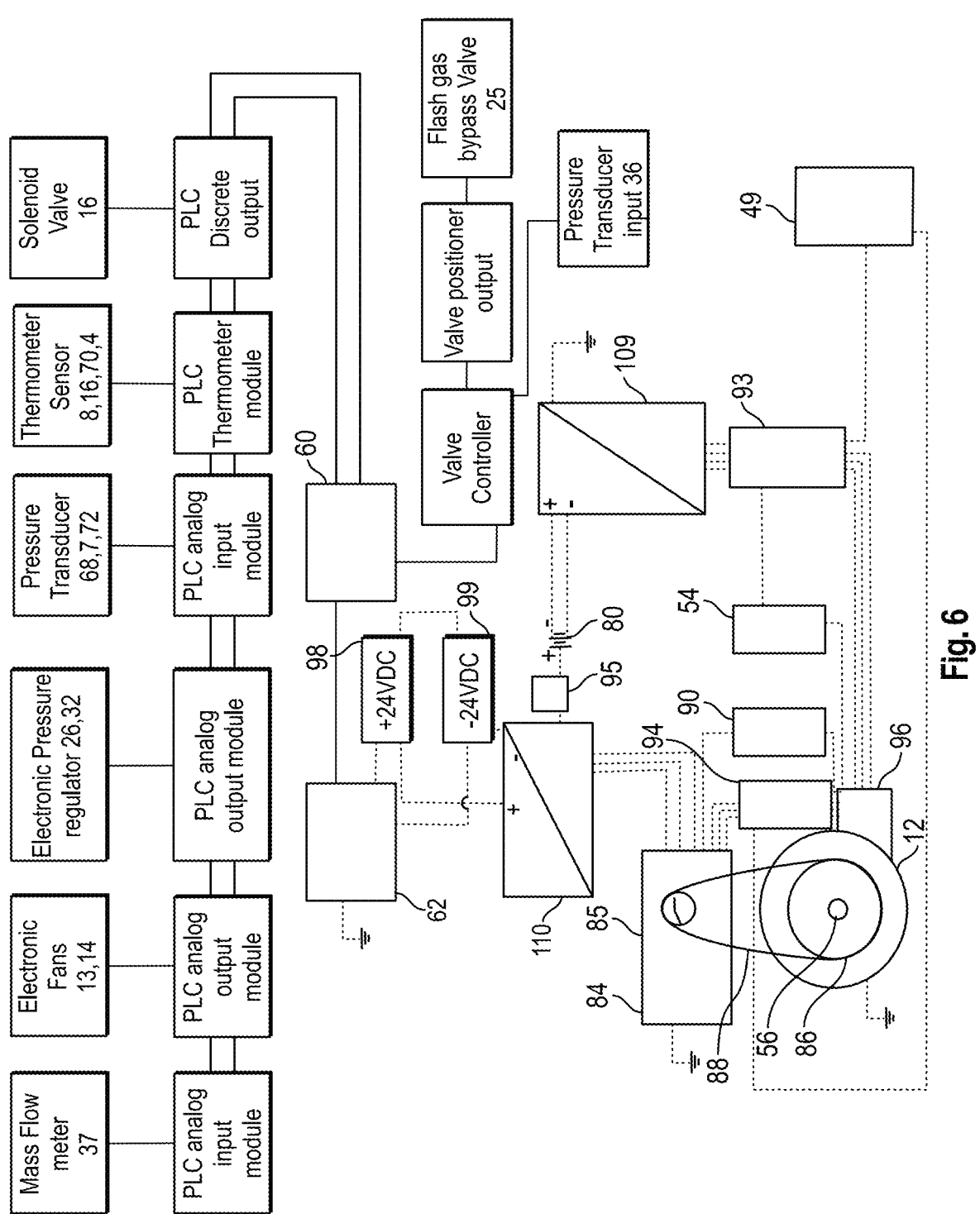
Figure 7:
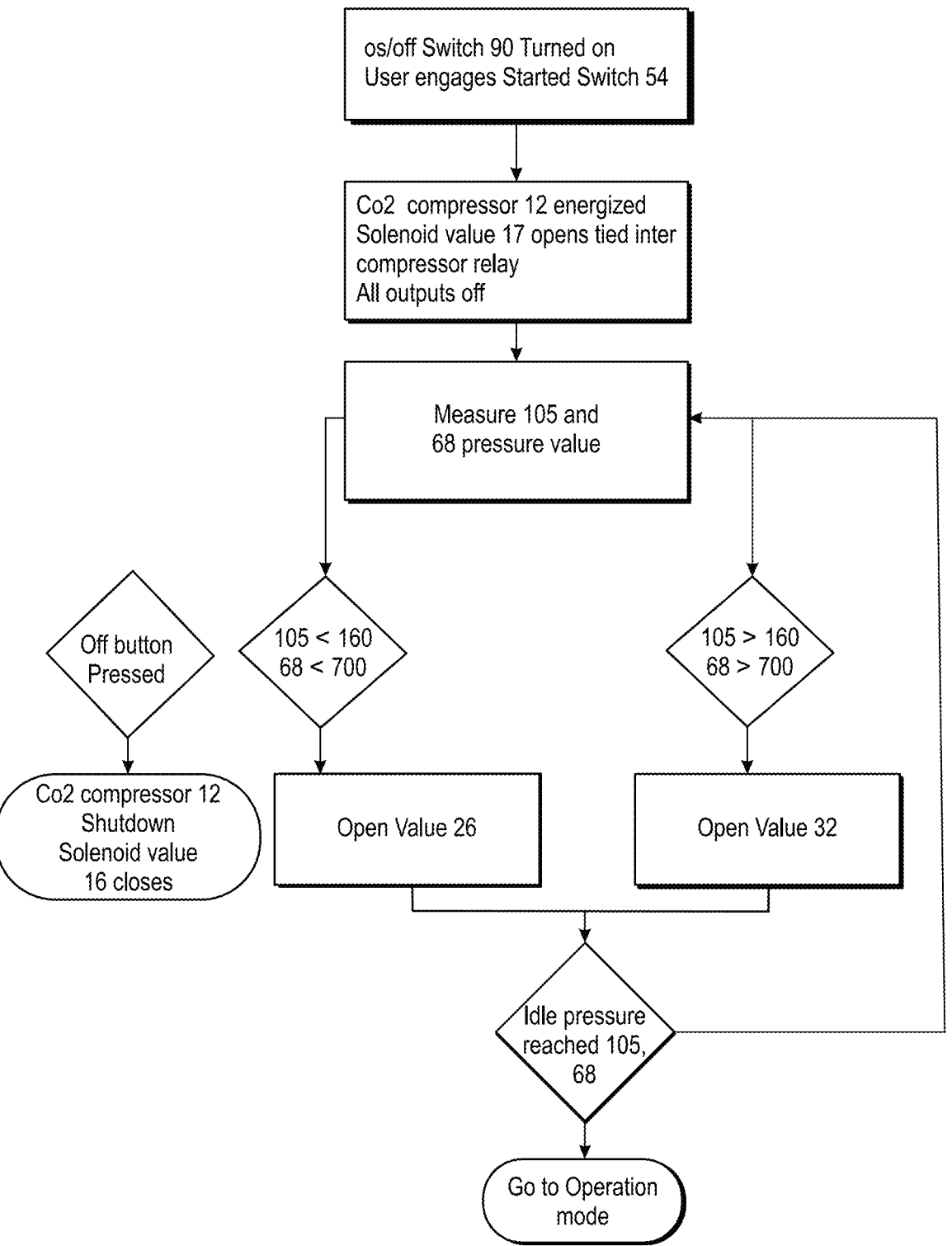
Figure 8:
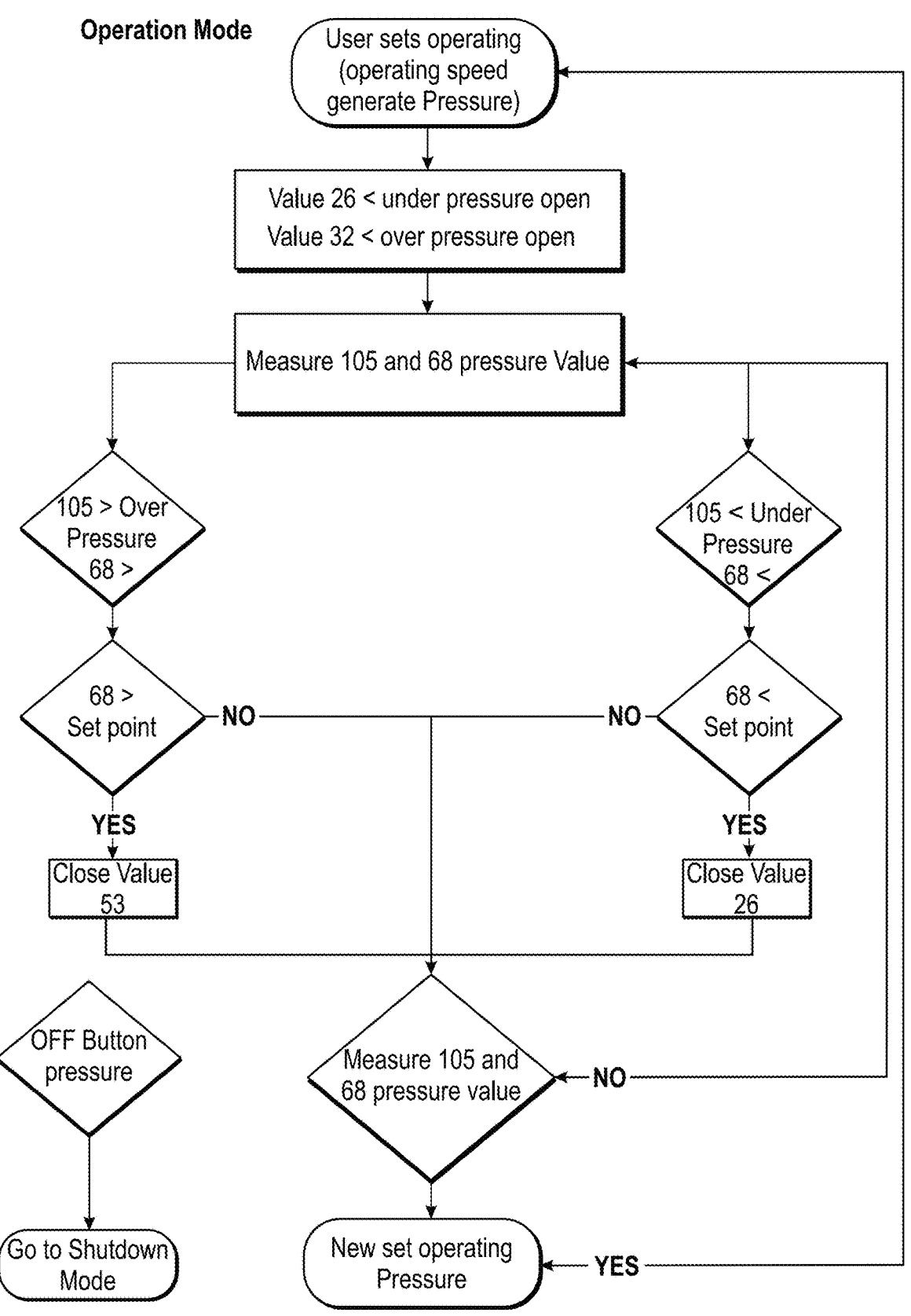
Figure 9:
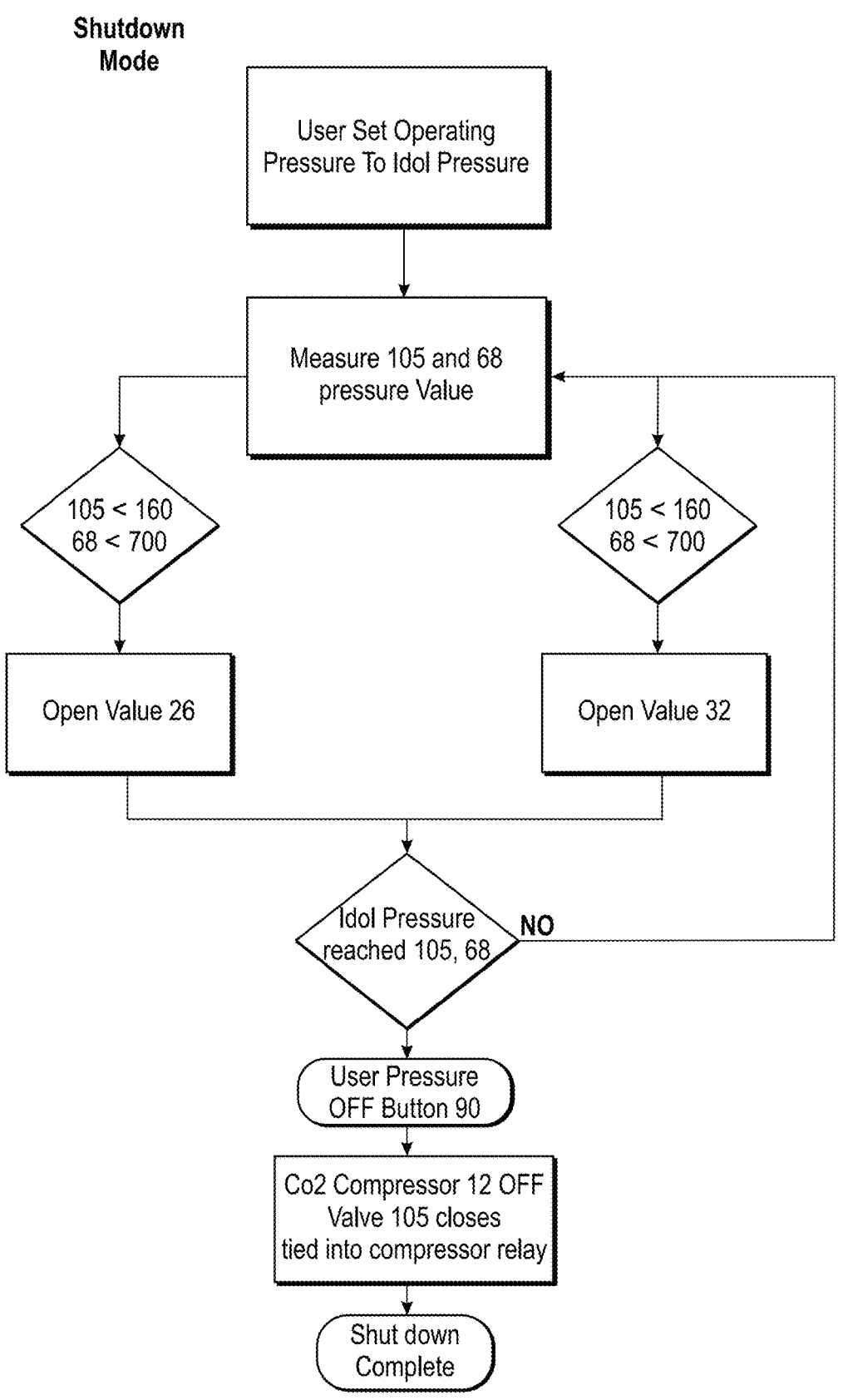

FIG. 6 shows a schematic view of electrical energy consumption and distribution;

FIG. 7 shows a flow chart of control system start mode;

FIG. 8 shows a flow chart of control system start mode;

FIG. 9 shows a flow chart of control system shut down mode; and

Figure 10:
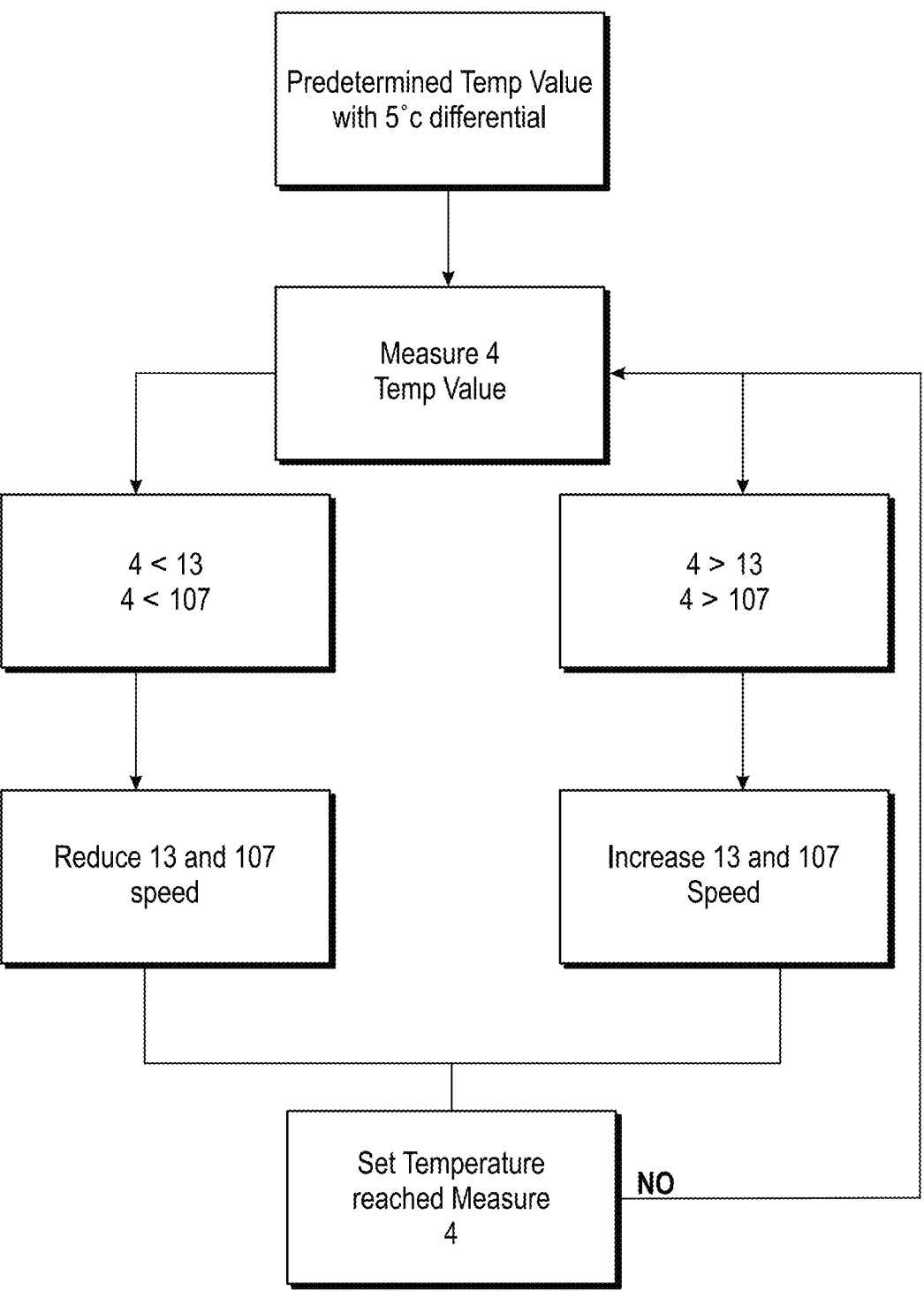

FIG. 10 shows a flow chart of control system operation mode of thermodynamics.

FIG. 11 shows a table of various properties of an exemplary embodiment of a system that includes a CO2 compressor.

DETAILED DESCRIPTION OF EXEMPLARY EMBODIMENTS

The figures are described below. Before the embodiments are to be explained in detail, it is to be understood that the presently disclosed subject matter is not limited in application or process to the details stated, as there are other embodiments and methods of carrying out and practicing the presently disclosed subject matter than those described. As such, the language used below is not limiting and states what may be used but may not necessarily be completely exhaustive.

It will be understood that, when an element is referred to as being "connected", or "coupled" to another element, it can be directly connected or coupled to the other element or intervening elements that may be present. In contrast, when an element is referred to as being "directly connected" or "directly coupled" to another element, there are no intervening elements present. As used herein "and/or" includes any and all combinations of one or more of the associated listing items. Further, it will be understood that when an element is "presented" to an entity, it can be presented electronically to the entity through multiple intermediaries or elements of the system. In addition, it will also be understood that when an element is referred to as being "directly presented" to an entity, it is presented electronically through only one intermediary or element of the system. In addition, it will be understood that when an element is presented or directly presented to an entity the presentation may take place on an electronic screen separate from any or all previous electronic screens.

It will also be understood that, although the terms "first", "second", etc. may be used herein to describe various elements or components, these elements or components should not be limited by these terms. These terms are only used to distinguish one element or component from another element or component. Thus, a first element or component discussed below could be termed a second element or component without departing from the teachings of exemplary embodiments. Further it will be understood that the use of "then", when used to describe connecting two steps of a logical process, indicates that the steps may occur sequentially, but does not preclude the addition of intermediary steps or elimination of one of the steps without departing from the teachings of exemplary embodiments.

Exemplary embodiments are described herein with reference to logical process illustrations that are schematic illustrations of idealized embodiments (and intermediate structures) of exemplary embodiments. As such, variations from the sequence of the illustrations as a result, for exemplary, of inclusion of intermediary steps, are to be expected. Thus, exemplary embodiments should not be construed as limited to the particular sequence of logical steps illustrated herein but are to include deviations in the sequence of the steps, for exemplary, from communication of electronic information to remote databases. Thus, the logical steps illustrated in the figures are schematic in nature and their sequence is not intended to limit to scope of exemplary embodiments.

The terminology used herein is for the purpose of describing particular embodiments only and is not intended to be limiting of exemplary embodiments. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which exemplary embodiments belong. It will be further understood that all terms, such as those defined in commonly used dictionaries, should be interpreted as having a meaning that is consistent with their meaning in the context of the relevant art and will not be interpreted in an idealized or overly formal sense unless expressly so defined herein. As used herein, expressions such as "at least one of", when preceding a list of elements, modify the entire list of elements and do not modify the individual elements of the list.

Various electrical or electronic elements of the disclosed embodiments, including but not limited to the power supply and control circuitry, are intended to include or otherwise cover all processors, software or computer programs capable of performing the various disclosed determinations, calculations, etc., for the disclosed purposes. For example, exemplary embodiments are intended to cover all software or computer programs capable of enabling processors to implement the disclosed processes. In other words, exemplary embodiments are intended to cover all systems and processes that configure a document operating system to implement the disclosed processes. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed above.

Reference will now be made in detail to embodiments, examples of which are illustrated in the accompanying schematics, wherein like reference numerals refer to the like elements throughout. In this regard, the present embodiments may have different forms and should not be construed as being limited to the descriptions set forth herein. Accordingly, the embodiments are merely described below, by referring to the figures, to explain exemplary embodiments of the present description. It is also important to note that various elements and features may be used interchangeably among the different disclosed embodiments, and so the various elements and features may be combined to achieve new embodiments.

In some embodiments a human machine interface may be used to allow humans to interact with and control machines. In the case of a power system, an HMI can be used to change the parameters of the system by providing a user-friendly interface that allows operators to input commands and adjust settings.

In some embodiments, the HMI may comprise a display screen, buttons, knobs, and other input devices that allow the operator to interact with the power system. The interface may display real-time data about the system, including temperature, pressure, flow rates, and other important parameters. To change the parameters of the power system, the operator can use the HMI to adjust various settings and controls. For example, the HMI may allow the operator to adjust the working fluid flow rate, change the engine speed, or modify the cooling system settings.

Once the operator has made the desired changes, the HMI sends the commands to the power system's control system, which adjusts the appropriate parameters to achieve the desired outcome. For instance, if the operator increases the working fluid flow rate, the control system will adjust the working fluid valves to deliver more working fluid to the centrifugal pump. The HMI can also be used to monitor the system and detect any issues or abnormalities. If a problem is detected, the HMI may alert the operator and provide instructions for troubleshooting or corrective action.

Overall, the HMI may provide a user-friendly interface for operators to control and monitor the power system. By allowing operators to adjust parameters and settings, the HMI can help optimize the performance of the system and ensure that it operates safely and efficiently.

In some embodiments, programmable logic boards (PLCs) can be used to automate the power system 10 by controlling various functions and processes within the system 10. A PLC is a type of computer system that is designed to operate in industrial environments, and it can be programmed to perform a wide range of tasks. To automate a power system using a PLC, various sensors and devices within the system can be connected to the PLC's input/output (I/O) modules. These sensors and devices can include things like temperature sensors, pressure sensors, flow meters, and switches.

In some embodiments, the PLC can be programmed to monitor the inputs from these sensors and devices, and to use this information to control various processes within the power system. For example, the PLC could be programmed to turn on or off specific components within the power system based on certain conditions or inputs. In some embodiments, the programming of the PLC can be done using specialized software that allows the user to create a series of instructions or "logic" that tells the PLC what to do. This logic can be customized to suit the specific requirements of the power system, and it can be modified or updated as needed.

Some of the benefits of using a PLC to automate a power system include improved reliability, increased efficiency, and reduced labor costs. By automating various functions within the power system, the PLC can help to ensure that the system operates smoothly and efficiently, while also minimizing the need for human intervention.

In some embodiments, the HMI may be used in tandem with the one or more PLCs, leading to several possible benefits. An HMI may provide a graphical interface that displays real-time data from the PLCs. This can help operators to better visualize the system's performance and identify any issues or areas for improvement. In some embodiments, an HMI can be configured to simplify the control of the PLC system by providing a user-friendly interface that allows operators to quickly and easily adjust settings, control processes, and monitor performance. An HMI may also be configured to provide advanced diagnostic capabilities that allow operators to identify and troubleshoot issues with the PLC system more quickly and accurately. An HMI may also help to improve data management by storing and organizing data from the PLC system in a more structured and accessible format. This can help operators to analyze data more effectively and make more informed decisions.

In some embodiments, embedded controller may be used in place of one or more of the PLCs. An embedded controller, similar to a PLC, is a microcontroller that is designed to be embedded in a specific application or system. It can be programmed to perform specific functions and communicate with other devices in the system. An embedded controller can be used in place of one or more of the PLCs in the power system 10 to automate and control various functions.

One advantage of using an embedded controller is that it may be a cost-effective solution for some applications in the power system 10. An embedded controller can perform the same functions as a PLC, but at a lower cost. It can also be programmed to communicate with other devices, such as sensors and actuators, to automate various tasks.

Additionally, in some embodiments, an embedded controller may be designed to be more compact than a PLC, which can be beneficial in applications where space is limited. The small size of an embedded controller can also make it easier to integrate into the power system 10.

In some embodiments, printed circuit boards (PCBs) may be used, including but not limited to embodiments that utilize PLCs or embedded controllers. By means of example, a PCB may be a board made of non-conductive material, such as fiberglass or plastic, with conductive pathways etched onto it. These pathways may be used to connect electronic components, such as resistors, capacitors, and transistors, together to form a circuit.

In some embodiments, PLCs and embedded controllers may use PCBs to house and interconnect their electronic components, making it easier to design and manufacture these systems. The PCB provides a compact and organized layout of the components, reducing the amount of space required for the system and making it easier to troubleshoot and repair any issues that may arise.

In some embodiments, the use of PCBs in PLCs and embedded controllers may allow for greater reliability and consistency in the manufacturing process. PCBs may be manufactured using automated equipment, ensuring that each board is identical and free from defects. This may result in a more consistent and reliable product, reducing the likelihood of system failure or malfunction.

In addition to interconnecting components, PCBs may also be used to provide additional functionality to PLCs and embedded controllers. For example, a PCB can be designed to include additional sensors, communication interfaces, or other components that can enhance the functionality of the system.

In some embodiments, digital microfluidics (DMF) may be used in the electronic systems of the power system 10 (including but not limited to PCBs, PLCs, HMIs, or any electronic component used in the power system 10) to perform various tasks, such as workflow automation, which may be critical in controlling and monitoring the system's operation. Digital microfluidics (DMF) is a technology that enables precise control of microscale fluid droplets using electric fields.

In some embodiments, one potential application of DMF in the power system 10 is in the cooling system. The DMF technology may be used to create a droplet-based cooling system, which can offer higher cooling efficiency and more precise temperature control compared to traditional cooling systems. In this approach, tiny droplets of coolant can be precisely dispensed and moved around on a surface using electric fields, which may provide efficient cooling to hotspots in the power system 10.

In some embodiments, DMF can also be used for sensing and analysis of various parameters in the power system 10, such as pressure, temperature, and flow rate. The DMF technology may be used to create microscale sensors that can detect these parameters with high accuracy and sensitivity.

Figure 1:
FIG. 1 shows a schematic view of one embodiment of the present invention.
Figure 1:
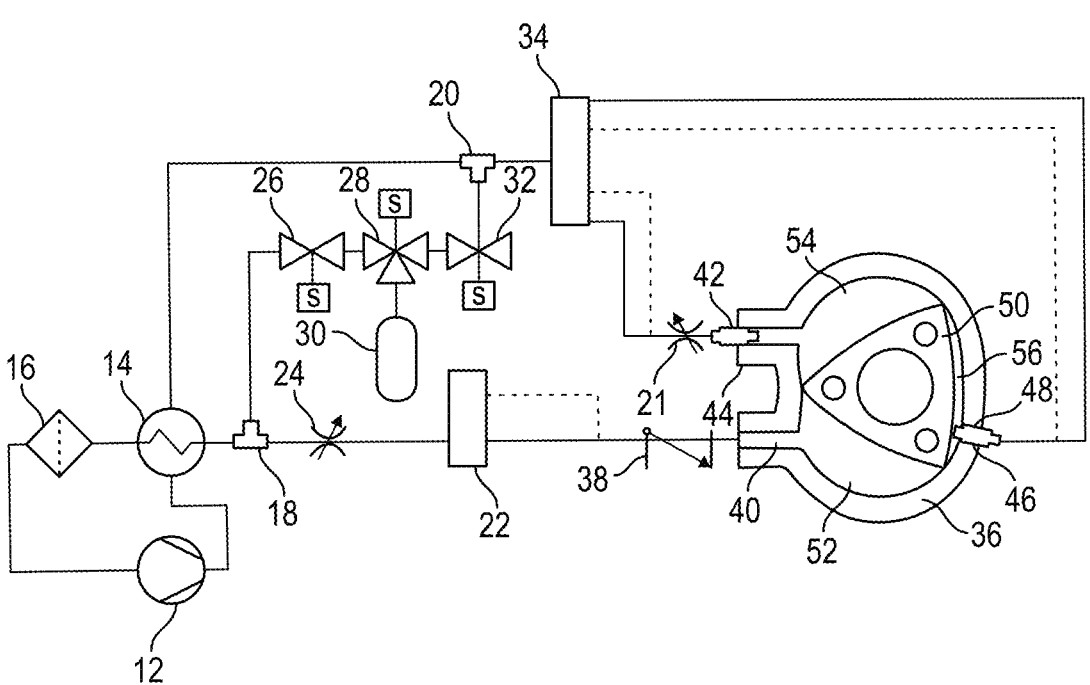

By way of example, and referring to FIG. 1, one embodiment of a power system 10. The power system 10 operates in a closed loop as follows. A compressor 12 is mechanically coupled to a heat exchanger 14 and a coalescent filter 16 with piping. The heat exchanger 14 is mechanically coupled to the coalescent filter 16, a first three-way junction 18, and a three-way junction 20 with piping. The first three-way junction 18 is mechanically coupled to a first manifold 22 with a pressure differential orifice 24 and piping. The first three-way junction 18 is further joined to a first solenoid 26 with piping. A three-way solenoid 28 is mechanically coupled to the first solenoid 26, an accumulator tank 30, and a second solenoid 32 with piping. The second three-way junction 20 is further mechanically coupled to the second solenoid 32 and a second manifold 34.

A rotary engine 36 is mechanically coupled to the first manifold with a check valve 38 at an exhaust port 40. The rotary engine 36 is further mechanically coupled to the second manifold 34 with a first electronic compression injector 42 at a fuel port 44. The rotary engine 36 is further mechanically coupled to the second manifold 34 with a second electronic compression injector 46 at a spark plug port 48.

The rotary engine 36 further comprises a rotor 50. An exhaust chamber 52 is arranged between the rotor 50 and the exhaust port 40. A low-pressure chamber 54 is arranged between the fuel port 44 and the rotor 50. A high-pressure chamber is 56 arranged between the spark plug port 48 and the rotor 50.

As the CO2 stream exits discharge port of the compressor 12 at 250 degrees Fahrenheit, 600 psi at flow rate of 4 CFM, traveling upstream entering heat exchanger 14 crossing CO2 streams with the cold low-pressure stream created from discharge port of pressure differential 24. The CO2 stream at high pressure side exits the heat exchanger 16 at 96 degrees Fahrenheit, 600 psi and flow rate of 4 CFM traveling upstream to the second manifold 34 where the CO2 stream is split in for streams traveling upstream to the fuel port 44 and the spark plug ports 48. The CO2 stream enters rotary engine 50 at 96 degrees Fahrenheit, 600 psi 4 CFM flow. The compressed CO2 entering rotary engine 36 through four electronic high-pressure injectors 46, 42 moves both the rotors orbital revolutions opening and closing the both injection port 44 and both the spark plug port 48. As the rotor 50 rotates it discharges the CO2 stream out both the exhaust port 40 and immediately out check valve 38 located at the exhaust port 40 so there is no pressure resistance in exhaust chamber 52 in the rotary engine 36. In some embodiments, the CO2 stream can exit the rotary engine 36 through two exhaust ports 40 passing respective check valves 38 and to a manifold 22 to combine the CO2 stream from two streams to one stream CO2 stream at 96 degrees Fahrenheit 600 psi 4 CFM. The CO2 stream travels upstream entering the pressure differential orifice 24. The CO2 stream exits the pressure differential orifice at 25 degrees Fahrenheit 200 psi choked flow. Then the CO2 stream travels upstream to the heat exchanger 14 crossing streams with hot high-pressure stream from discharge port of CO2 compressor. The low pressure CO2 stream exits the heat exchanger 14 at 40 degrees Fahrenheit 200 psi. The CO2 stream then travels upstream to a suction port of the compressor 12 which is configured to create a volumetric flow change exiting a discharge port of the compressor 12 at 190 degrees Fahrenheit, 600 psi 4 CFM in a continuous closed loop system.

A user can increase and decrease rotational speed of the rotary engine 36 by throttling and de-throttling the carbon dioxide flow. The accumulator tank 30 is joined to an L type 3-way electronic solenoid valve 28 coupled to the first solenoid expansion valve 26 and the second solenoid expansion valve 32. One solenoid valve can be used to transfer carbon dioxide from the accumulator tank to the flow, increasing the flow and another can be used to transfer carbon dioxide into the accumulator tank, decreasing the flow rate.

When throttling occurs the 3-way valve 28 opens to allow CO2 to exit from accumulator tank 30 at rate set by a control module up to 400 psi to enter the first electronic expansion solenoid valve 26 then open the first solenoid valve 26 traveling upstream to branched off first three-way-junction 18 at low pressure side of system. The CO2 stream from the accumulator tank 30 pressure decreases from 600 psi down to 400 psi equalizing the pressure of the low-pressure side of system increasing system pressure from 200 psi to 400 psi at three-way junction 18. Pressurized CO2 then travels upstream entering the suction port of the compressor 12 at 400 psi increasing the volumetric flow rate from 4 CFM to 8 CFM. The increased flow rate increases the discharge pressure at discharge port of compressor 12 from 600 psi to 800 psi. Likewise, increased pressure and flow increases the rotational speed of the rotary engine 36.

When de-throttling occurs the three-way solenoid valve 28 opens to allow CO2 to enter the accumulator tank 30. The second solenoid valve 32 opens to allow carbon dioxide to enter the three-way solenoid valve 28 and thus into the accumulator tank 30. CO2 stream from the second three-way junction 20 is at the high pressure side of system. After depressurizing from 800 psi to 600 psi depressurizing is complete when accumulator tank 30 and high-pressure side are equal pressure at 600 psi. This would be considered idle.

Figure 2:
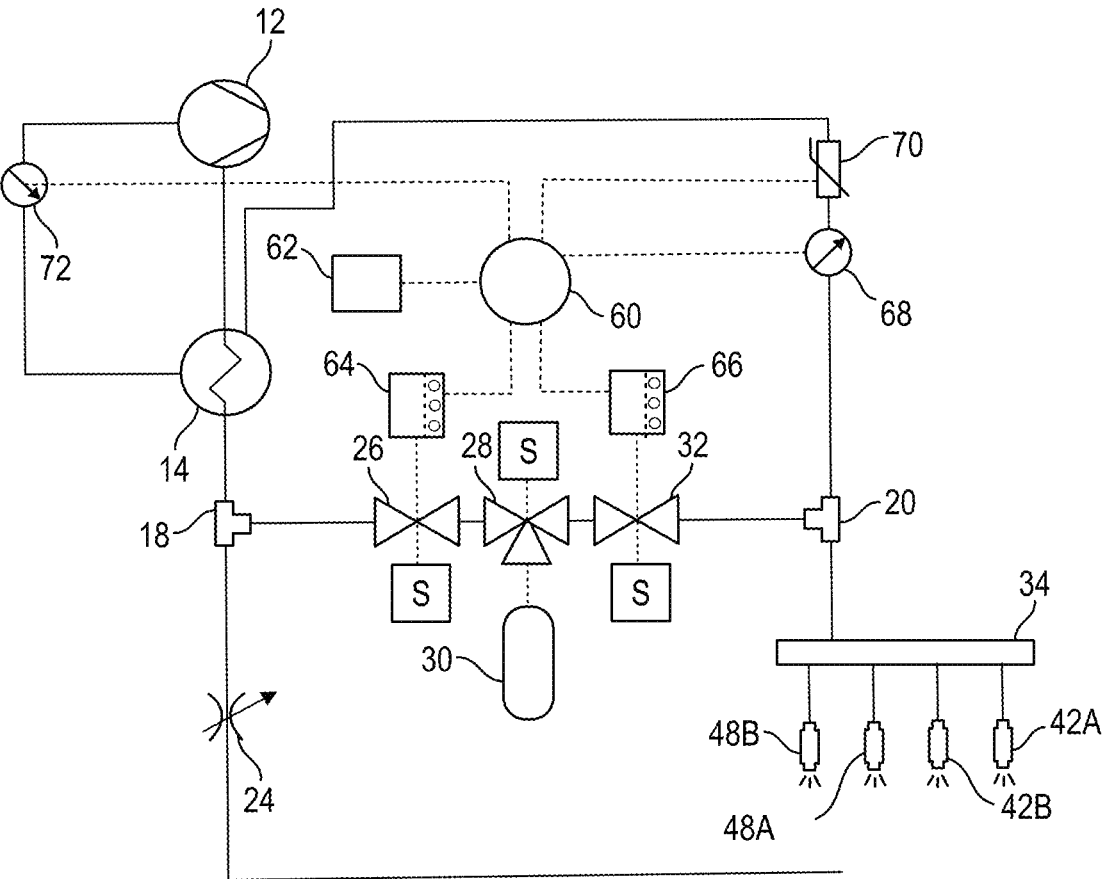
FIG. 2 shows a schematic view of one embodiment of the present invention.

Turning to FIG. 2, a controller 60 is electrically coupled to a control module for throttling and de-throttling 62, a first solenoid valve positioner 64, a second solenoid valve positioner 66, a high pressure side pressure transducer 68, a high pressure side temperature transducer 70, and a low pressure side temperature transducer 72 as is shown by dotted lines. This embodiment has the second manifold 34 mechanically coupled to a first electronic compression injector 42A, a second electronic compression injector 48A, a third electronic compression injector 42B, a fourth electronic compression injector 48B. The pressure and temperature readings above are collected by the transducers. The controller 60 then adjusts as necessary to adjust rotational speed as necessary.

Figure 3:
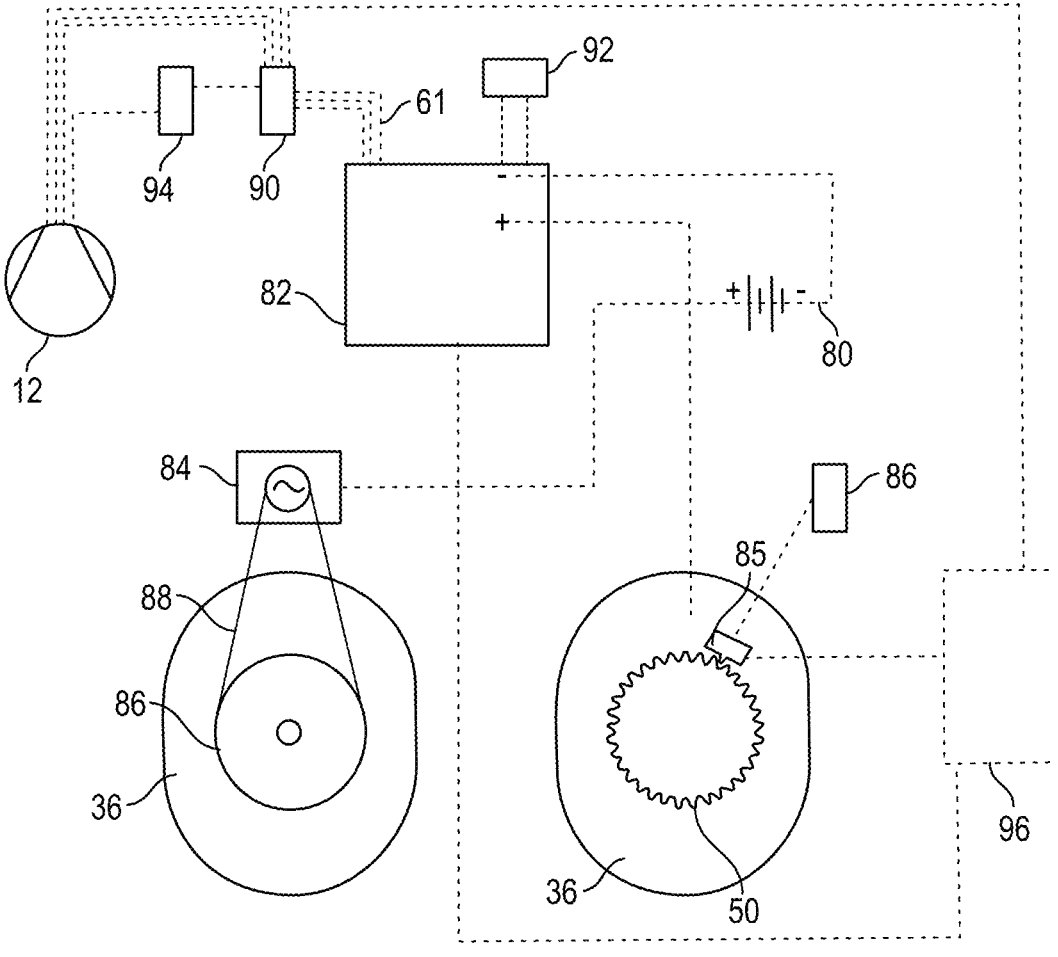
FIG. 3 shows a schematic view of one embodiment of the present invention.

Turning to FIG. 3, battery 80 is electrically coupled to inverter 82 and alternator 84. The alternator 84 is connected to a flywheel 86 with a belt 88. The flywheel 86 is mechanically coupled to the rotor 50 on the rotary engine 36. The schematic separates the rotor 50 from the rotary engine 36 for clarity. The inverter 82 is further electrically coupled to a starter 85 on the rotor 50. An ignition switch 86 is communicatively coupled to the starter 85 to engage the starter 85.

The inverter 82 is further electrically coupled to a compressor ground fault circuit interceptor 90 and a module ground fault circuit interceptor 92. The compressor ground fault circuit interceptor 92 is electrically coupled to the compressor 12 with a switch 94. The module ground fault circuit interceptor 92 provides electrical power as needed throughout the power system 10. Inverter 82, starter 85 and compressor ground fault circuit interceptor 90 are all electrically coupled to ground 96.

As used in this application carbon dioxide presents substantial improvements in efficiency as a working medium in generating internal energy in a CO2 piston compressor within an isolated piping network where the internal energy is constant. A CO2 piston compressor coefficient of energy with a higher useful compressor energy compared to total energy input. CO2 piston compressors are widely used in the commercial refrigeration industry and have an extremely high coefficient of performance within energy efficiency measured in volume cooling capacity of 5 to 8 times the common refrigerants. A CO2 piston compressor has lower compression ratios leading to higher compressor isentropic efficiency. The high vapor pressure leads not only to low-pressure ratio with the advantages of high compressor efficiency, but also to high heat transfer coefficients and low relative pressure losses. Additionally CO2 must operate at high pressure, which can increase system efficiency, reduce the size of components and piping and enable the design of compact design.

A power system within a closed piping network where heat change at constant pressure is equal to the enthalpy of piping network. Properties of which do not change during system operation only at the expense of user set operating parameters. The power system is configured to transfer electrical energy input received from alternator two CO2 piston compressor, pressurizing rest mass-energy being carbon dioxide as the working fluid. Pistons and internal shaft attached to crank shaft as part of CO2 piston compressor rotate with same motion of rotation from relativistic mass momentum. Transferring electrical energy input to internal energy mechanical work to kinetic energy generating rotational energy. Direction of work is proportional to the relative RPM of crankshaft, which are proportional to internal energy heat transfer between suction and discharge ports, where heat transfer is used as Gibbs Free Energy. Thermodynamic process in which a quantity of energy is transferred in and out of system through evaporator and condensers with forced air sub system. Exchanging thermodynamic potential with surrounding environment. Carbon dioxide stream leaving CO2 piston compressor through piping network having momentum from applied force of compressor pistons. Passing through two pressure differential orifices separated by a flash tank delivered to CO2 centrifugal pump. Changing phase from gas to liquid carbon dioxide entering CO2 centrifugal pump flowing through and spinning opposed impeller and rotor configuration, rotating crankshaft transferring energy per unit mass from specific energy to kinetic energy generating rotational energy.

A power system having a mechanical efficiency using less work to move working fluid as a conservative force than for the conversion into heat. Conserved energy is density equal to pressure in the amount of working fluid as energy stored in power system per unit volume of working fluid. Momentum of working fluid traveling in a closed loop piping network driven by compressor. Delivered to centrifugal pump as source of constant contained energy generating transferred to kinetic energy to rotational energy by an amount of moving objects in compressor and centrifugal pump that is independent of the working fluid path. Total work done by working fluid is zero conserving energy as energy stored and the overall conservation of energy. Carbon dioxide is a real gas furthermore all collisions between modules and the walls are elastic with no loss to friction with no dissipated heat.

$$\text{Efficiency} = \frac{\text{Compressor Output} + \text{Centrifugal Pump Output}}{\text{Total Power Input}}$$

Internal energy mechanical of work is converted to kinetic energy and is related to changes in carbon dioxide properties within CO2 piston compressor between suction and discharge port. Kinetic energy is a product of CO2 piston compressor using a steam compression cycle pressurizing pistons rotating an inner shaft measured as direction of work by extensive property changes entropy S, volume V, and specific pressure P and temperature T. The generalized displacement defines mechanical direction of work δW. The direction of heat transfers Q where T denotes the temperature and S denotes the entropy δQ. Change in internal energy is directly related to pressurization of pistons equal to rotation of inner shaft attached to crankshaft having same motion of rotation extending outside shell of CO2 piston compressor. RPM of crankshaft rotation is proportional to change in extensive properties within CO2 piston compressor. Referencing FIG. 11 performance CO2 compressor example data crankshaft has a rotational energy of 1450 RPM at maximum operating condition. Internal energy mechanical work is a product within CO2 piston compressor from pressurization of pistons between suction port and discharge port and is the mechanical work done converted to kinetic energy generating rotational energy CO2 compressor component and piping network are a thermally isolated system and mechanically isolated system, and is not subject to system surrounding decreasing or consuming internal energy. Internal energy is exactly proportional to momentum of working fluid mass-energy. Using FIG. 11 mechanical work done at CO2 piston compressor at maximum operating condition, transferring consumed electrical energy of 12.50 kw to 45,000 J/S of useful compressor kinetic energy. Compressor manufacturer performance data has a total energy input of 12.50 KW at 95.2% operating efficiency, adding 28% for alternator rated torque 96. Nm and misc system electrical consumption equals 16 KW compressor has a coefficient of energy of 2.8.

$$\delta W = P \cdot dV$$

$$\delta Q = T \cdot ds$$

Gibbs free energy is the maximum amount of work that can be extracted that can change heat for work from thermodynamic closed system. The extracted work exergy is configured to cooling and heating capacity used for maintaining system thermodynamic equilibrium within system and surrounding environment through forced air over evaporated and condenser coils. When system properties change enthalpy and entropy increase or decrease equals the work done by the system to its surroundings. Gibbs free energy AG thermodynamic potential is a product of property changes in carbon dioxide stream piping network proportional to heat transfer δQ added as heat between inlet and outlet port of CO2 piston compressor. Gibbs free energy AG can be calculated with extensive properties enthalpy Ah, entropy AS, and temperature T.

Referencing FIG. 11, performance system example data at maximum operating condition and compressor manufactures performance data at 95.2% efficiency. The extracted work used for maintaining system thermodynamic equilibrium with system and surrounding environment cooling capacity of 25. kW at evaporator and heating capacity of 39.37 kW at condenser. Heating operating temperature at condenser 115.6° C., cooling operating temperature at evaporator −24° C. These temperatures can be extracted from condenser and evaporator in piping network and used to maintain thermodynamic equilibrium within system and surrounding environment.

$$AG=AH-TAS$$

Specific energy converted to kinetic energy generating rotational energy is a product of piping network delivery of constant flow of liquid carbon dioxide with 2% to 5% concentration of polyester lubricant at a specified viscosity, pressure, flow velocity, density, and mass flow rate delivered to centrifugal $CO_2$ pump. Mass flow rate entering inlet port of centrifugal pump is governed by upstream density and pressure of pressure differential orifices which is equally relative to volumetric displacement at $CO_2$ reciprocating compressor as driving force of carbon dioxide working fluid in piping network. Mass flow rate can be increased or decreased in power system relative to change in volumetric displacement in $CO_2$ piston compressor, governed by pressure and temperature delivered to suction port of compressor, as accumulator tank discharges and absorbs working fluid from piping network. Centrifugal $CO_2$ pump is positioned downstream of low pressure differential orifice. High and low pressure differential orifice restricts flow lowering pressure and temperature of $CO_2$ working fluid, changing phases from carbon dioxide gas to liquid carbon dioxide entering centrifugal $CO_2$ pump. Liquid carbon dioxide stream flows through rotor/impellers as specific energy that is converted to kinetic energy configured to produce rotational energy of crankshaft. Converting kinetic energy to mechanical energy for external mechanical load and/or electrical energy for power system components and or electrical power bank or grid. Although the velocity is constant, the mass flow rate is dependent on the density equal to pressure and temperature upstream of high pressure differential orifice, which is a function of $CO_2$ compressor volumetric flow rate generated from inlet pressure and temperature of working fluid. Reference FIG. 11 performance system example data at maximum operating condition carbon dioxide stream leaving low pressure differential office at a reduced pressure 17 bar, dynamic viscosity 150.47 uPa°S, temperature-24° C., density 1052.57 $Kg/m^3$ molecular weight 44. g. Entering a centrifugal pump spinning impeller and rotors rotating crank shaft. Centrifugal pump impeller/rotor are driven by mass-energy momentum from compression of working fluid at $CO_2$ compressor. Centrifugal pump with referenced properties having a kinetic energy of 11,982 J/S, where M is mass and $W^2$ is flow velocity.

$$KE=0.5\times M\times W^2$$

Sizing centrifugal pump to compressor compare flow rate, rotational speed, diameter of the impeller and blading, fluid density and viscosity. Avoiding cavitation by monitoring net positive suction head (NPSH) the difference between suction pressure and saturation pressure of fluid being pumped maintaining NPSH at a level greater than NPSH required by pump manufacture.

Figure 4:
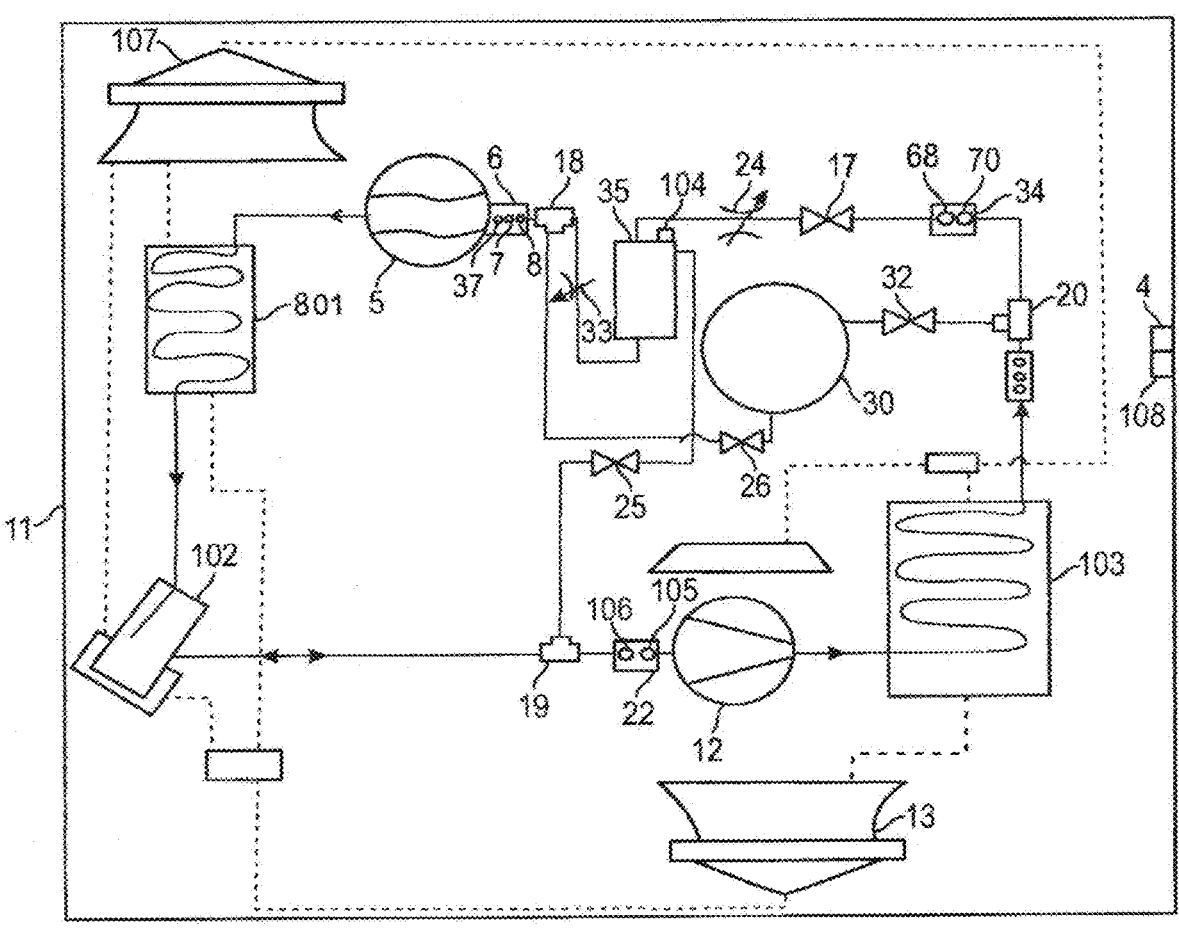
FIG. 4 shows a schematic view of propulsion system carbon dioxide piping network and components as well as he system and surrounding environment thermodynamics.

By way of example, turning to FIG. 4, a reciprocating $CO_2$ compressor 12 located upstream of condenser 103 and downstream of liquid tank 102 in a carbon dioxide piping network. And is the driving force of the $CO_2$ and working fluid within a closed loop piping network delivered to $CO_2$ centrifugal pump as specific energy. And is configured to convert total energy input to added heat transfer δQ and mechanical work done δW for total internal energy. Change in temperature across $CO_2$ compressor provides heating capacity maintaining thermodynamic equilibrium within system and surrounding environment delivered to condenser 103. Low pressure low temperature carbon dioxide gas entering suction port of $CO_2$ compressor 12 through delivery piping network. $CO_2$ reciprocating compressor, working with a steam compression cycle raising temperature of inlet gas and reducing volume by applying a massive amount of pressure at pistons. Pressure is driving force in piping network and volumetric change is associated with property changes between inlet and outlet port of $CO_2$ reciprocating compressor 12 performance efficiency is governed by operating parameters evaporating temperature and suction pressure of carbon dioxide stream entering inlet port of $CO_2$ piston compressor 12. $CO_2$ piston compressor 12 can be both transcritical and subcritical or only subcritical with variable RPM. $CO_2$ piston compressor 12, converts total energy input to heat transfer δQ added heat to working fluid used as Gibbs free energy in combination with condenser 103 and evaporator 108 as it is related to maintaining thermodynamic equilibrium with system and surrounding environment within enclosure 11. $CO_2$ piston compressor 12 using same total energy input converts to mechanical work done δW. Using external variables associated with volumetric displacement within $CO_2$ piston compressor 12 as it is directly related to pressurization of pistons attached to internal shaft attached to crankshaft rotating at RPM with same motion with pressurization of pistons. $CO_2$ piston compressor moving parts are lubricated with a mass fraction of 2% to 5% polyalkylene glycol oil.

A condenser 103 located upstream of manifold 34 and downstream of $CO_2$ reciprocating compressor 12 and is configured to maintain thermodynamics equilibrium within system and surrounding environments to receive high pressure, high temperature carbon dioxide stream from $CO_2$ piston compressor 12. Condenser 103 transfers heat from carbon dioxide stream to the ambient air in enclosure 11 or direct hot air outside enclosure 11. Heat is transferred from condenser coils 103 by use of circulating fans that force cool air over hot coils absorbing heat.

A manifold 34 located upstream of solenoid valve 17 and downstream of condenser 103. Manifold 34 houses pressure transducer 68 and thermocouple 70. Manifold 34 receives high-pressure gas carbon dioxide stream from condenser 103.

A thermocouple 70 housed in manifold 34 and configured to send analog input signals of temperature measurement to human machine interface (HMI) of carbon dioxide stream upstream of pressure differential orifice.

A pressure transducer 68 housed in manifold 34 and configured to send analog input signals to programmable logic controller (PLC) for analog output signals from PLC to electronic pressure regulating valve 26 and 32 to open and close increasing or decreasing carbon dioxide stream pressure and flow rate to user's set operating parameters.

A solenoid valve 17 located upstream of high pressure differential orifice 24 and downstream of manifold 34. And is wired on same contact as $CO_2$ compressor 12 and is configured to open when $CO_2$ compressor 12 is energized and close when $CO_2$ compressor 12 is deenergized. Maintaining a high and low rest mass-energy pressure in piping network when power system 10 is off.

A high pressure pressure differential office 24 is located downstream of solenoid valve 17 and upstream of flash tank 35. And is configured to create a pressure differential across orifice, changing carbon dioxide gas to liquid carbon dioxide having a medium pressure, low temperature, high density, and viscosity of liquid carbon dioxide stream leaving out port of high pressure pressure differential orifice 24 mass flow rate, density and flow velocity are determined upstream of pressure differential orifice for downstream parameters. Delivered to flash tank 35, change in temperature and pressure across orifice 24 assures liquid carbon dioxide flows into flash tank.

A flash tank 35 with a pressure transducer 104 located downstream of high pressure differential orifice 24 and upstream of low pressure differential office 33. And is designed to receive medium pressure low temperature liquid carbon dioxide. The pressure in the flash tank 35 is held at a constant pressure that is sufficient to maintain differential pressure throughout the system. Pressure transducer 104 measures pressure in flash tank 35.

A flash gas bypass valve 25 located upstream of tee 19 branched in piping network upstream of manifold 22 and downstream of liquid tank 102. Flash gas bypass valve 25 is branched downstream of flash tank 35 and is designed to allow flash gas collected in flash tank 35 to pass to tee 19 entering suction port of compressor 12.

A low pressure differential orifice 33 is located upstream of centrifugal pump 5 and downstream of flash tank 35. And is configured to create a pressure differential across orifice. This pressure drop from medium pressure low temperature liquid carbon dioxide to low pressure very low temperature liquid carbon dioxide assuring only liquid carbon dioxide leaving out port of low pressure differential office 33 entering inlet port of centrifugal pump five.

A manifold 6 located downstream of low pressure pressure differential orifice 33 and upstream of centrifugal CO2 pump 5. Manifold 6 houses thermocouple 8 and pressure transducer 7 and thermal mass flow meter 37.

A thermocouple 8 located in manifold 6 and is configured to send analog input signals to HMI of carbon dioxide stream. Before being delivered to input port of centrifugal CO2 pump 5.

A pressure transducer 7 housed in manifold 6 measures pressure, and is configured to send analog input signal to HMI of carbon dioxide stream. Before being delivered to input port of centrifugal CO2 pump 5.

A thermal mass flow rate housed in manifold 6 and is configured to send analog input signals to HMI 62 of mass flow rate entering inlet port of centrifugal CO2 pump. Mass flow rate is directly related to volumetric change in CO2 piston compressor 12 which is related to temperature and increased/decreased pressure at suction port of CO2 piston compressor.

A centrifugal CO2 multistage barrel pump 5 used with low viscosity fluids is located downstream of manifold 6 and upstream of evaporator 801 and is configured to receive CO2 as working fluid from pressure differential orifice 24 at specific energy pressure, density, viscosity, velocity, and mass flow rate driven by CO2 reciprocating compressor volumetric displacement. Change in CO2 reciprocating compressor volumetric displacement is equally proportional to change in specific energy in centrifugal CO2 pump. Centrifugal pump is configured to increase pressure and temperature of continuous flow of liquid carbon dioxide with 2% to 5% concentration of polyalkylene glycol oil/CO2 mixture as CO2 working fluid. Delivered from pressure differential orifice 24 converted to kinetic energy flowing through opposed/impeller back to back rotor configuration at constant operation using swirl brakes rotating crank shaft Kinetic energy is transferred to rotational energy for external mechanical load and or electrical energy. Centrifugal CO2 pump receives liquid carbon dioxide at density, mass flow rate and dynamic viscosity that can sustain forces and achieve specific speeds and efficiency in centrifugal CO2 pump. CO2 stream leaves CO2 centrifugal pump as a liquid carbon dioxide with higher pressure and temperature.

An evaporator 801 located downstream of CO2 centrifugal pump 5 and upstream of liquid tank 102. And is configured to maintain thermodynamic equilibrium within system and surrounding environment evaporator 801 receives liquid carbon dioxide stream from CO2 centrifugal pump 5 and discharge gas carbon dioxide stream. Heat is absorbed over evaporator coils by use of circulating fans forcing warm air over coils.

A liquid receiver tank 102 is located downstream of evaporator 801 and upstream of CO2 piston compressor 12. And is configured to stabilize pressure of carbon dioxide stream and prevent liquid carbon dioxide from entering input of CO2 piston compressor 12. Polyalkylene glycol oil collects in liquid receiver tank up to outlet port and is discharged out with working fluid.

A manifold 22 located downstream of liquid receiver tank 102 and upstream of CO2 piston compressor 12. Manifold 22 houses pressure transducer 105 and thermocouple 106. Manifold 22 receives low pressure low temperature gas carbon dioxide stream from liquid receiver tank 102.

A pressure transducer 105 housed in manifold 22 measures pressure and is configured to send analog output signal to PLC, for analog output signals from PLC. Two electronic pressure regulating valves 26 and 32 to open and close, increasing or decreasing carbon dioxide pressure in piping network. Pressure transducer 105 is monitored for system operating pressure entering input port of CO2 piston compressor 12 for maintaining volumetric efficiency at CO2 piston compressor 12.

A thermocouple 106 housed in manifold 22 measures temperature and is configured to send analog input signals to HMI of carbon dioxide stream. Maintaining system operating temperature entering input port of CO2 piston compressor 12 for maintaining volumetric efficiency.

An electronic pressure regulating valve 32 located downstream of tee 20 branched in upstream of pressure differential orifice 24 of piping network. And is configured to receive analog output signals from PLC received from pressure transducer 68 and 105 as analog input signals. Depressurizing pressure in piping network between 40% and 100% load.

An electric pressure regulating valve 26 located upstream of Tee 18. Branched in piping network downstream of pressure differential orifice 24 of piping network and is configured to receive analog output signals from PLC received from pressure transducer 68 and 105 as analog input signals. Increasing pressure in piping network between 40% and 100% load.

And accumulator tank 30 located between electronic pressure regulating valve 26 and 32 branched off piping network. And is configured during power system startup idle and shut down holds 60% of the carbon dioxide retained from piping network as stored mass-energy. Accumulator tank 30 is configured to pressurize and depressurize carbon dioxide piping network, in partnership with electronic pressure regulating valve 26 and 32 increasing pressure at suction port of compressor equally increasing specific energy of working fluid at centrifugal pump. To users set parameters set at HMI.

By way of example and referring to FIG. 4, consumed electrical energy transferred to internal energy heat transfer at compressor is used for Gibbs free energy for maintaining system thermodynamic equilibrium within system and surrounding environment through condenser and evaporator. A power system 10 may be positioned inside an engine enclosure 11 with the back enclosure wall vented.

In some embodiments, one or more wall vents may be positioned on any part of the enclosure to provide ventilation and help regulate the temperature inside the enclosure. In some embodiments, the size of the wall vents should be large enough to allow sufficient airflow to regulate the temperature inside the enclosure, but not so large that it compromises the insulation of the enclosure 11. The appropriate size will depend on the size of the enclosure 11, the amount of heat generated by the power system, and the environmental conditions outside.

In some embodiments, the wall vents may be placed on the side of the enclosure that is exposed to the coolest air or the least direct sunlight to help optimize the cooling effect. The wall vents may also be positioned to avoid the flow of exhaust fumes or any other contaminants that can affect the air quality within the enclosure 11.

In some embodiments, the wall vents may be equipped with filters to prevent dust and other particles from entering the enclosure 11. This helps to keep the air inside the enclosure clean and minimize the risk of damage to the power system.

In some embodiments, dampers may be installed in the wall vents to help regulate the airflow and control the temperature inside the enclosure 11. These dampers can be adjusted manually or automatically, depending on the specific requirements of the power system and environmental conditions.

In some embodiments, it may be beneficial to design the enclosure wall 11 to minimize heat transfer between the power system 10 and the surrounding environment through the enclosure wall 11. An engine enclosure can be built to insulate a power system from its surrounding environment by using materials and design techniques that minimize the transfer of heat and energy between the inside and outside of the enclosure. Some of the techniques include but are not limited to using insulating materials such as fiberglass, foam, or mineral wood, inserting a gap layer between the inside and outside of the enclosure walls, using sealing some parts of the enclosure like gaps and cracks to prevent unwanted air exchange, and careful positioning of components.

Components of power system 10 consist of hot temperatures generating heat, and cold temperature absorbing heat. In some embodiments, it may be beneficial to position hot components on one side of the engine enclosure and cold components on the other side in order to help optimize the thermal management of the power system. By separating the hot and cold components, it is possible to create a temperature gradient across the enclosure, with hot components generating heat on one side and cold components dissipating heat on the other side. This gradient can help facilitate the transfer of heat from the hot components to the cold components, allowing for more efficient cooling of the system. In addition, separating the hot and cold components can help reduce the risk of damage to sensitive components due to excessive heat exposure. This is especially important in high-power systems where the heat generated by certain components can be significant. According to the figure, components with high temperatures may be positioned near the right side wall and components with cold temperatures may be positioned near the left side wall.

Ambient control inside enclosure 11 is maintained near constant specified temperature independent of outside ambient temperature. Suction fan 13 positioned in near corner of front wall and right side wall. Receives air from hot components and pushes hot air over coils in evaporator 801 and jacketed liquid receiver tank 102. Cool air leaving evaporator 801 and jacketed liquid at receiver 102, enters suction fan 107. Positioned near corner of backwall and left side wall. Receives cool air and pushes cool air over $CO_2$ piston compressor 12 and over coils in condenser 103, then returning back to suction fan 13 for continuous operation. Temperature controlled enclosure is maintained with a thermocouple sensor 4 and $CO_2$ sensor 108 inside enclosure 11 sending input signals to programmable logic controller that sends output signals to specific variable speed fans 13 and 107 for maintaining a specified ambient operating temperature inside enclosure 11. $CO_2$ compressors high volume of cooling capacity with high heat transfer coefficient, maintains system equilibrium with its environment within temperature controlled enclosure even in harsh environments.

By way of example and referring to FIG. 4 and referencing FIG. 11. A power system 10 is designed to pressurize stored rest mass-energy being carbon dioxide as a working fluid in an isolated system. Performance calculation are based on system parameters at idle mode and max operating mode. The working fluid in the power system 10 is a function of several equal derivatives that run parallel to each other allowing operating parameters between the two modes to be configured. Carbon dioxide is compressed in a compressor 12 through pressurization of pistons driving working fluid momentum of mass. Working fluid entering suction port of compressor at idle pressure as carbon dioxide gas, pressure 18.6 bar temp −21° C., specific volume 0.0195 $m^3$/kg, flow velocity at sonic speed. Discharge out discharge port of compressor as high pressure, temperature carbon dioxide gas, pressure 54, temperature 87° C., specific volume 0.0106 $m^3$/kg, flow velocity 271.68 m/s having compressor useful mechanical work of 48,060. J/S generating rotational energy.

Working fluid entering suction port of compressor at maximum pressure as carbon dioxide gas, pressure 30 bar, temperature −5° C., specific volume 0.0116 $m^3$/kg, flow velocity at sonic speed. Discharged out discharge port of compressor as high pressure, high temperature carbon dioxide gas, pressure 90 bar, temperature 115.6° C. specific volume 0.0066 $m^3$/kg C, flow velocity 286 m/s. Having compressor useful mechanical work 45,000 J/S generating rotational energy. Working fluid traveling downstream to evaporator 103 at maximum operating conditions entering as hot high pressure carbon dioxide gas 90 bar, temperature 115.6° C., specific enthalpy 26.44 KJ/KG. Discharged out discharge port of evaporator 103 medium temperature, high-pressure carbon dioxide gas, 90 bar, temperature 46.11. Working fluid traveling downstream to manifold 30 housing pressure transducer 68 and thermocouple 70 working fluid leaving manifold 34 passing electronic solenoid valve 17 normally closed when not energized maintaining high and low pressure side of system when system is at rest.

Working fluid traveling downstream entering high pressure differential orifice as medium temperature high-pressure carbon dioxide gas, pressure 90 bar, temperature 46.11° C. undergoes phase change leaving high pressure differential orifice to medium pressure low temperature liquid carbon dioxide, 34 bar, temperature 0° C., density 929 Kg/m³ traveling downstream to flash tank 35 flash gas in flash tank 35 is fed through a flash gas bypass valve 25 back to the compressor. The flash gas bypass valve 25 maintains a constant pressure in the flash tank and removes the gas build up in the flash tank 35 from input signals from pressure transducer 104.

Working fluid traveling downstream leaving flash tank 35 as liquid carbon dioxide at pressure 34 bar, temperature 0° C. passes through low pressure differential orifice. Leaving orifice as a liquid carbon dioxide pressure 17 bar temperature −24° C. density 1052.57 Kg/m³, molecular weight 44.2 dynamic viscosity 150.47 uP° S, flow velocity 738.11 working fluid passing through manifold 6 housing thermocouple 8, pressure transducer 7 and mass flow meter 37 entering centrifugal pump 5 at momentum of mass-energy as a constant source spinning impellers and rotors. Liquid carbon dioxide leaving centrifugal pump 5 pressure 30.3, temperature between −24° C. and −5° C. having a kinetic energy of 11,982 J/S generating rotational energy at centrifugal pump. Working fluid entering centrifugal pump at idle mode as liquid carbon dioxide pressure 10 bar, temperature −40° C., density 1117.25 Kg/m³, dynamic viscosity 194.0 uP°S, flow velocity 857.7 m/s molecular weight 44. g. Centrifugal pump having kinetic energy of 16,168 J/S generating rotational energy. Working fluid leaving centrifugal pump five pressure 18.6 bar, temperature between −21° C. and −40° C.

Working fluid at maximum operating properties travels as liquid carbon dioxide downstream entering evaporator 801 pressure 30 bar temperature between −24° C. and −5° C. leaving evaporator 801 at 30 bar, temperature −5° C. as carbon dioxide gas. Working fluid traveling downstream enters liquid tank 102, trapping any liquid carbon dioxide in stream of working fluid. Gas CO2 exits liquid tank 102 traveling downstream passing manifold 22 housing pressure transducer 105, thermocouple 106 entering suction port of compressor 12 as carbon dioxide gas 30 bar, temperature −5° C., specific volume 0.0116 m³/Kg repeating the loop for constant source of momentum of mass-energy as a carbon dioxide working fluid.

An accumulator tank 30 that is three times the volume of high-pressure side of power system 10. In some embodiments, the size of the accumulator tank 30 may be a different positive multiplier of the volume of the high-pressure side of the power system 10, with good results between 1 and 10 times the volume of the high pressure side. Accumulator tank 30 holds 36 bar. The difference between Maximum operating pressure and idle pressure on high-pressure side of system at idle mode. User sets HMI for acceleration electronic pressure regulating valve 26 opens increasing liquid carbon dioxide entering CO2 centrifugal pump 5 and increasing suction pressure at CO2 piston compressor 12 from 18.6 bar to 30 bar, supplied by accumulator tank 30 pressure monitored and maintained by pressure transducer 105. In some embodiments, referencing FIG. 11, increasing suction pressure increases discharge pressure at CO2 compressor up to max operating pressure 90 bar monitored and maintained by pressure transducer 68. User sets HMI for deceleration to ideal Reducing suction pressure to 18.6 bar and discharge pressure to 54. bar. Electronic pressure regulating valve 32 opens decreasing pressure at high pressure side of piping network systematically decreasing pressure at low pressure side of system downstream of low pressure differential orifice 33. Pressure decreases on high-pressure side from 90. bar to 54. bar as carbon dioxide stream is routed back to accumulator tank 30 pressure monitored and maintained by pressure transducer 68. Pressure systematically decreases on low pressure side from 30 bar to 18.6 bar monitored and maintained by pressure transducer 105. Pressure relief valves located on CO2 compressor 12 positioned on low and high pressure side of CO2 compressor 12 for piping network for over-pressurization in case of automated or valve failure.

By way of example and referring to FIG. 5 specific energy as pressure, velocity, mass flow rate and viscosity of liquid carbon dioxide in a constant momentum of contained mass-energy delivered to centrifugal CO2 pump 5 through rotor/impeller rotating crank shaft 57 converting specific energy to kinetic energy generating rotational energy for mechanical energy through motion of rotation of shaft 57, for mechanical propulsion and/or electrical energy. Detail A shows kinetic energy of generating rotational energy transferred to electrical energy. Rotational motion of crank shaft 57 with attached crank pulley 87 rotate alternator pulley 75 attached with serpentine belt 78 energizing alternator 74 windings supplying electrical energy to electrical bank/grid 97. Detail B shows kinetic energy generating rotational energy for mechanical energy, rotational motion of crank shaft 57 with attached flywheel 50 supplying external mechanical work through rotation motion, of fly wheel 50. Detail C shows kinetic energy generating rotational energy for converted to mechanical energy, rotational motion of optimize shaft 57 with attached propeller 58.

In some embodiments, the crank/optimized shaft 57 can be improved in order to maximize its strength, durability, and efficiency, while minimizing weight and friction. In some embodiments, certain materials may be chosen for the shaft, such as high-performance alloys like titanium and stainless steel, which are commonly used for rotary engine shafts due to their excellent strength-to-weight ratios and corrosion resistance.

In some embodiments, surface treatments may be applied to the shaft to reduce friction and increase durability. A coating of diamond-like carbon (DLC), for example, can improve wear resistance, while reducing friction and heat buildup.

In some embodiments, balancing the shaft may be critical to minimizing vibration and ensuring smooth operation. Properly balancing the shaft can also help to extend the life of other components within the engine.

In some embodiments, the shaft 57 may have a specific structure to reduce weight and increase efficiency. Using a hollow or tapered design, for example, can help to reduce weight while maintaining strength and durability.

By way of example and referring to FIG. 6, illustrates power system electrical system for start-up, continuous operation and shutdown. Startup user turns on single pole single throw switch 90 allowing electrical current to flow from alternator 84 through ground fault circuit interrupter 94 to CO2 piston compressor 12. User engages momentary switch 54. Energizing CO2 piston compressor 12 from electrical energy stored in batteries 80. DC current from batteries 80 travels through DC to AC transformer 109 ground fault interceptor 93 is electrically coupled to Co2 piston compressor 12 with a momentary switch 54. Solenoid valve 17 opens from normally closed position on same relay as CO2 piston compressor. Energized CO2 piston compressor 12 pressurizes stored rest mass-energy circulating carbon dioxide through piping network generating internal energy through volumetric change of carbon dioxide within CO2 piston compressor 12 generating momentum of mass at a constant contained mass energy. Rotating a crankshaft 56 fixed to internal shaft of CO2 piston compressor through compression of pistons. Crankshaft 56 is fixed to crank pulley 86 transferring rotational motion to alternator pulley 85 through serpentine belt 88.

Rotational motion of alternator pulley 85 energizes alternator 84 windings converting kinetic energy to electrical energy. Alternator 84 supplies whole system 10 with electrical energy consumption through ground fault interceptor 94 and capacitor 96 to CO2 piston compressor 12 and AC to DC transformer 110 to PLC 60 and HMI 62. Alternator 84 provides continuous electrical energy to CO2 piston compressor 12 due to the converted kinetic energy as rotational motion supplied by CO2 piston compressor 12. CO2 piston compressor 12 provides continuous kinetic energy to alternator 84 due to alternator 84 supplying continuous electrical energy consumption to CO2 piston compressor 12.

Alternator 84 supplies electrical current to positive and negative terminal bus 98 and 99 energizing HMI 62, PLC 60, one valve positioner and one valve controller, fans 13 and 107, valves 26 and 32, flash gas by pass valve 25, thermocouple sensors 8, 16, 70, 4 pressure transducer sensor 68, 7, 105, 104, CO2 sensor 108 mass flow meter 37. AC/DC transformer 110 charges battery 80 with charge controller 95. Transformer 109, 110, CO2 piston compressor 12 alternator 84 and HMI 62 are all electrically coupled to ground. Shutdown user turns off single pole-single throw switch 90 when system is ideal mode breaking contact with CO2 piston compressor 12 and solenoid valve 17 closing valve 17 holding standstill pressures on low and high side of piping network at idle pressure.

Referring to FIG. 11 referenced, Dorin CO2 piston compressor at maximum operating condition has a power consumption of 12.5 KW at efficiency oh 95.2% generated from manufacture performance calculations. Additional 28% for alternator resistance of 1.4 KW. Fans, valves, sensors, and automated system have a power consumption of 3.5 kW equaling total power consumption of system 16 KW referenced compressor has a useful compressor kinetic energy of 45 KW having a coefficient of energy over one. CO2 piston compressor internal energy work equal to rotational energy motion of rotation of crankshaft with maximum RPM of 1450. Change in suction pressure between 30 bar and 18.6 bar while maintaining optimum suction temperatures is directly proportional to energy consumption. In some embodiments, the alternator 84 generates a minimum of 16 kW at 1450 RPM for whole system electrical consumption for continuous operation. An alternative to serpentine belt 88 and pulleys 85 and 86 would be coupling shaft 56 and alternator shaft together strictly dependent on shaft sizing and component positioning in enclosure.

In another embodiment, turning to FIG. 7 start mode on/off switch activates the starter motor energizing CO2 compressor 12 opening solenoid valve 17 on same relay as CO2 compressor 12. Pressure regulating valves 26 and 32 outputs are off. Pressure transducer 68 and 105 measures pressure on low pressure side (saturated side) and high-pressure side (general side), of system sending input signal to PLC 60. PLC 60 sends output signal to valve positioners for pressure regulating valve 26 and 32 for valve position maintaining set pressure of idol pressure.

Turning to FIG. 8, operation mode pressure transducer 68 sends input signals to PLC 60. Based on user selection to accelerate increasing pressure and mass flow or decelerate decreasing pressure and mass flow. Output signal is sent from HMI to PLC to output modules for pressure regulating valve 26 and 32 four valve position, based off user input speed and input signals from pressure transducer 68.

Turning to FIG. 9, shut down mode system returns to idle pressure on/off switch 90 engaged brakes electrical contact between alternator 84 and CO2 compressor 12 and closing solenoid valve 17 on same relay.

Turning to FIG. 10, when system energized thermocouple 4 sends input signal of measured value within enclosure 11 to PLC 60. PLC 60 sends output signals to variable speed fans 13 and 107 based off measured value of thermocouple 4.

In some embodiments, the power system 10 configured to run a closed loop of CO2 allowing for recycling of CO2. In some embodiments, both subcritical and supercritical CO2 is used and, in some embodiments, only subcritical is used in the closed loop. In some other embodiments, only subcritical CO2 is used in the closed loop.

The closed loop system has several advantages over an open loop system. Firstly, some embodiments may be configured to reduce the amount of CO2 gas that is released into the environment, as the gas is recycled instead of being vented. This makes some embodiments more environmentally friendly than an open loop system. Secondly, the closed loop system is more efficient, as it requires less energy to compress the CO2 gas.

In some embodiments, supercritical and subcritical CO2 are two different states of CO2 that can be used in a closed loop system for different applications. Supercritical CO2 is a state in which CO2 is heated and compressed beyond its critical point. In this state, CO2 has unique properties that make it an excellent solvent for many applications, including extraction and purification. In some embodiments, supercritical CO2 may be used to extract essential oils, flavors, and fragrances from plant material. Subcritical CO2 is a state in which CO2 is heated and compressed, but it is kept below its critical point. In this state, CO2 has properties that make it an excellent refrigerant for some embodiments. Subcritical CO2 is often used as a refrigerant in air conditioning and refrigeration systems and may also be useful to combine these properties for use in essential oils extraction. In a closed loop system, subcritical CO2 is compressed and cooled to maintain its refrigeration properties, allowing it to be reused in the cooling process.

The closed loop system is ideal for both supercritical and subcritical CO2 applications because it allows the CO2 to be reused and recycled within the system. In a closed loop system, the CO2 is captured, compressed, and cooled, then returned to the process for reuse. This minimizes waste and reduces the environmental impact of using CO2. In some embodiments, the CO2 compressor can use both subcritical and supercritical CO2 to increase efficiency in different parts of the process. For example, subcritical CO2 may use as a refrigerant to cool down the compressor components and the gas being compressed, which reduces the energy required to compress the fluid and supercritical CO2 may be used as a working fluid to transfer heat in the heat exchanger, which increases the efficiency of the heat transfer process.

In some embodiments, by using both subcritical and supercritical CO2 in the compressor, the overall efficiency of the system can be increased. The use of subcritical CO2 for refrigeration may reduce the energy required to compress the gas, while the use of supercritical CO2 for heat transfer may increase the efficiency of the heat transfer process. This may result in a more efficient and environmentally friendly system, which can be used for various applications such as power generation, refrigeration, heating, and essential oil extraction.

Embodiments are also intended to include the used of open loop CO2 systems. In an open loop system, CO2 is not recycled like in a closed loop system. Instead, it is used as a working fluid that passes through the power system once and is then released to the atmosphere. In this system, the $CO_2$ is not recovered and recycled, which can lead to higher operating costs and environmental impact compared to a closed loop system.

However, using $CO_2$ in an open loop system in some embodiments may still provide certain benefits. One of the main advantages may be that the open loop can simplify the design and construction of the power system. Without the need for a closed loop and the associated equipment to recover and recycle the $CO_2$, the system can be designed with fewer components and may be easier to operate and maintain.

A power system meaning a generator or a propulsion system or combination of both. Configured to transfer whole system total energy input to internal energy related to mechanical direction of work $\delta W$, heat transfer $\delta Q$ related to Gibbs free energy and specific energy relating to kinetic and potential energy. Each is a function of state alongside property variables that describe equilibrium states of the system. Using carbon dioxide as a working medium in an isolated system.

Internal energy related to mechanical direction of work $\delta W$ can be expressed from the difference determined by thermodynamic process within $CO_2$ compressor. Direction of work $\delta W$ measured with extensive property changes volume within $CO_2$ compressor and specific pressure. Mechanical direction of work occurs within $CO_2$ compressor from pressurization of pistons attached to internal shaft attached to crankshaft extending out shell of $CO_2$ compressor that rotate with same motion of rotation with pressurization of pistons. Mechanical direction of work $\delta W$ is transferred to kinetic energy generating rotational energy through motion of rotation. Crank pulley attached to crankshaft rotating alternator pulley attached with serpentine belt, energizing alternator coils. Rotational energy measured with revolution per minute of crankshaft kinetic energy is transferred to electrical energy through motion of rotation transferred to alternator supplying total energy input. Useful compressor energy $\delta W$ divided by total energy input power-greater than one.

Internal energy related to heat transfer $\delta Q$ is energy added as heat at $CO_2$ compressor delivered to piping network. Measured by extensive property changes entropy and specific temperature within $CO_2$ compressor. Heat transfer $\delta Q$ transferred to Gibbs free energy G within piping network and can be measured with extensive properties enthalpy, entropy, and temperature. Gibbs free energy G is configured to cooling and heating capacity used for maintaining system thermodynamic equilibrium within system and surrounding environment. By use of forced air over evaporator/condenser coils and jackets delivered through ducks surrounded by enclosure.

Internal energy related to mechanical direction of work $\delta W$ related to volumetric flow and pressure discharge at $CO_2$ compressor is the driving force of carbon dioxide in piping network delivered to centrifugal $CO_2$ pump as a specific energy and can be measured by flow velocity and mass flow calculated to kinetic energy. Liquid carbon dioxide stream flowing through $CO_2$ centrifugal pump vane/airfolds rotating turboshaft/turboprop converting specific energy to kinetic energy. Kinetic energy generating rotational energy measured by revolution per minute of crank/optimized shaft. Rotational energy of rotating shaft used for population, external mechanical load, electrical energy for electrical grid or power system component routed through alternator.

A power system configured to increase RPM and torque from idle speed and decrease RPM and torque from maximum operating speed to idle speed as it relates to motion of rotation of crankshaft/optimized shaft in $CO_2$ centrifugal pump. Changes in volumetric displacement at $CO_2$ reciprocating compressor is equally proportional to changes in pressure and mass flow rate entering $CO_2$ centrifugal pump as it is proportional to rate of rotation of crankshaft/optimized shaft. Changes in volumetric displacement are made by increasing and decreasing pressure entering suction port of $CO_2$ piston compressor from accumulator tank branched in downstream of low pressure differential orifice and upstream of high pressure differential orifice of piping network. Pressure transducer position downstream and upstream of pressure differential orifice send input signals of measured pressure to PLC. PLC sends output signal to pressure regulating valve is located between accumulator tank and branched in piping network downstream of low pressure differential orifice and upstream of high pressure differential orifice. Accumulator tank discharged pressure through pressure regulating valve branched and downstream of low pressure differential orifice increasing volumetric displacement and pressure at $CO_2$ piston compressor. Accumulator tank receives pressure through pressure regulating valve branched in upstream of high pressure differential orifice decreasing volumetric displacement and pressure at $CO_2$ piston compressor.

An electrical system configured to supply electrical energy to whole system electrical energy consumption for continuous operation start up user turns on/off switch between alternator and $CO_2$ piston compressor. User engages monetary switch energizing $CO_2$ piston compressor from electrical energy stored in batteries. Opening solenoid valve 17 upstream of pressure differential office. Internal energy produced through pressurization of pistons rotates internal shaft attached to crankshaft attached to crank pulley rotates alternator pulley attached to alternator through serpentine belt. Relieving battery of work, alternators supplies electrical energy to whole system electrical energy consumption. $CO_2$ reciprocating compressor supplies internal energy mechanical work converted to kinetic energy generating rotational energy transferred to electrical energy through motion of rotation of crankshaft at $CO_2$ reciprocating compressor.

An automated system programmed to start system at predetermined set pressure and temperature of ideal mode. Pressure regulating valve adjust system pressure and piping network reaching measured idle pressure. User sets operating speed. Pressure regulating valve adjust system pressure and piping network to user set operating speed reaching measured set pressure. User returns system to idle reaching measured idle pressure. User presses off button in idle mode holding idle pressure downstream and upstream of pressure differential orifice. Control system is connected to compressor, HMI, PLC, four pressure transducers, three thermocouples, one mass flow meter, two pressure regulating valves, one flash gas bypass valve with valve positioner and controller, one solenoid valve, tachometer, and programmed with instructions. In some embodiments, the programmed instructions pertain to the following:

i. Entering a start/idle mode:

ii. On/off switch turned on iii. Starter switch engaged iv. $CO_2$ compressor energized, solenoid valve 17 opens tied into compressor relay. Pressure transducers on low and high pressure side of system measure pressure. Electronic pressure regulating valve 26 opens increasing pressure to idle pressure. Electron pressure regulating valve 32 opens decreasing pressure to idle pressure.

v. Entering operation mode:

vi. User sets operating pressure vii. Valve 26 opens increasing system pressure to set pressure viii. Valve 32 opens decreasing system pressure to set pressure ix. Pressure transducer on low and high pressure side measure pressure Over pressurize valve 32 opens decreasing pressure x. Underpressure valve 26 opens in increasing pressure Set operating pressure reached all outputs off xi. Shut down mode:

xii. User sets operating pressure to idle pressure xiii. Pressure transducers on low and high pressure side measure pressure valve xiv. Valve 26 opens increasing pressure to idle pressure xv. Valve 32 opens decreasing pressure to idle pressure xvi. Idle pressure reached measured at low and high side pressure transducer a user presses on/off switch xvii. CO2 compressor turns off, solenoid valve 17 closes located near pressure differential orifice tied into same relay as CO2 piston compressor holding idle pressure at low and high side of piping network.

xviii. Shut down complete

An automated system for mechanical energy and/or electrical energy. Power system maintaining thermodynamics equilibrium within system and surrounding environment. To predetermined set temperature measured in the enclosure. Fans adjust speed reaching measured temperature. Control system consists of two variable speed fans, one thermocouple and one CO2 sensor. Fans force air over condenser and evaporator coils.

In some embodiments, the following method may be used with the apparatus/system:

i. Operation mode system thermodynamics:

ii. Predetermined enclosure temperature valve with differential iii. Fan 13 and 107 increases speed lowering enclosure temperature and piping network temperature Fan 13 and 107 decrease speed increasing enclosure temperature and piping network temperature Thermocouple 4 measures temperature and enclosure iv. Fans increase speed lowering enclosure and piping network temperature v. Fans decrease speed increasing enclosure and piping network temperature vi. Set operating temperature reached operation mode As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A power system where different components transfer different total energies derived from the same working fluid mass energy and momentum, the power system comprising:

a booster system configured to move working fluid from a low temperature through a centrifugal pump to a medium temperature to a compressor, the low temperature low pressure working fluid increases viscosity moving through the centrifugal pump that sustains forces and achieves speeds and efficiencies of the centrifugal pump, the centrifugal pump discharges working fluid to the compressor at a pressure and temperature to a suction port of the compressor maintaining a volumetric flow rate, temperature, and pressure;

a switch configured to allow electrical current to flow from an alternator through a ground fault circuit interrupter to the compressor from electrical energy stored in batteries, energizing compressor pistons compressing stored resting energy of the working fluid in a piping network circulating the working fluid;

a valve wired to the compressor and is configured to open when the compressor is energized and close when the compressor is deenergized, maintaining a high and low pressure side of the piping network providing system design pressures for power system startup;

wherein the compressor comprises an external crank shaft which is part of or the same as an internal shaft of the compressor configured to rotate from pressurization of pistons generating mechanical energy, mechanically coupled to an alternator crank shaft rotating at the same motion of rotation, the energized alternator provides electrical consumption of the compressor through the ground fault interceptor and a capacitor to the compressor;

wherein the piping network has property changes proportional to heat transfer added as heat between the inlet and the outlet port of the compressor and is configured to be extracted from a condenser and an evaporator within the piping network to be used for cooling and heating capacity for maintaining the system thermodynamics equilibrium within the system and surrounding environment; and wherein the centrifugal pump comprises an external crank shaft which is part of or the same as an internal shaft of the centrifugal pump and is attached to an impeller and a rotor configuration which rotates from the same working fluid mass energy and momentum derived from the compressor flowing through the impeller and the rotor configuration attached to the external crank shaft, wherein energy is transferred to rotational energy for external mechanical load and or electrical energy.

2. The power system of claim 1, further comprising an accumulator tank storing working fluid mass energy when the system is depressurizing or at rest and releasing working fluid stored mass energy into the piping network increasing the power system energy consumption and mechanical output energy.

3. The power system of claim 2, further comprising a pressure regulator valve operatively coupled to the accumulator tank and branched into the high pressure side of the piping network and configured to operate from signals from a pressure transducer routed through a programable logic controller to depressurize working fluid mass energy and momentum in the piping network lowering power system energy consumption, and equally lowering mechanical output energy.

4. The power system of claim 2, further comprising a pressure regulating valve, operatively coupled to the accumulator tank and branched into the low pressure side of the piping network and configured to operate from signals from the pressure transducer routed through the programable logic controller to pressurize working fluid mass energy and momentum in the piping network increasing power system energy consumption, and equally increasing generated mechanical energy at the compressor and the centrifugal pump crankshaft.

5. The power system of claim 1, further comprising a flash gas bypass valve configured to allow flash gas collected in a flash tank to be rerouted in the piping network after the discharge port of centrifugal pump and before the suction port of the compressor to prevent cavitation within the centrifugal pump.

6. The power system of claim 1, further comprising a means of calculating the power system total coefficient of energy which is calculated by generated internal energy plus generated specific energy converted to kilowatts divided by total consumed energy of power system using the formula:

$$\text{Coefficient of energy (kW)} = \frac{\text{Internal energy} + \text{specific energy}}{\text{Total Consumed Energy}}$$

7. The power system of claim 6, the means of calculating additionally calculates generated specific energy at the centrifugal pump using the formula:

$$BHP = Q - P/C * N$$

P—Pressure, Q—volumetric flow rate, N—efficiency, C—conversion factor, BHP—brake horse power.

8. The power system of claim 6, the means of calculating additionally calculating generated internal energy at the compressor using the formula:

$$\delta w = P * dv$$

P—discharge pressure, dv—change in volume, δw—output work.

* * * * *